US012531027B2

(12) United States Patent
Park et al.

(10) Patent No.: US 12,531,027 B2
(45) Date of Patent: Jan. 20, 2026

(54) DISPLAY APPARATUS AND ELECTRONIC DEVICE INCLUDING THE SAME

(71) Applicant: Samsung Display Co., LTD., Yongin-si (KR)

(72) Inventors: Junhyun Park, Yongin-si (KR); Youngwan Seo, Yongin-si (KR); Minjae Jeong, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 19/023,913

(22) Filed: Jan. 16, 2025

(65) Prior Publication Data

US 2026/0018122 A1 Jan. 15, 2026

(30) Foreign Application Priority Data

Jul. 9, 2024 (KR) ........................ 10-2024-0090669

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0426* (2013.01); *G09G 2300/0819* (2013.01); *G09G 2330/021* (2013.01)

(58) Field of Classification Search
CPC ............... G09G 3/3233; G09G 3/3266; G09G 2300/0426; G09G 2300/0819; G09G 2330/021
See application file for complete search history.

(56) References Cited

U.S. PATENT DOCUMENTS

| | | | | |
|---|---|---|---|---|
| 2021/0264857 A1* | 8/2021 | Wang | .................. | G09G 3/3258 |
| 2021/0280140 A1* | 9/2021 | Lee | ........................ | H10D 86/60 |
| 2021/0375209 A1* | 12/2021 | Han | ..................... | G09G 3/3258 |
| 2022/0122549 A1* | 4/2022 | Choi | .................... | G09G 3/3233 |
| 2022/0351673 A1* | 11/2022 | Kim | ......................... | G09G 3/32 |
| 2023/0025117 A1* | 1/2023 | Kim | ........................ | G05F 1/565 |

(Continued)

FOREIGN PATENT DOCUMENTS

| | | |
|---|---|---|
| KR | 1020210152085 A | 12/2021 |
| KR | 1020220063789 A | 5/2022 |
| KR | 1020220119239 A | 8/2022 |

*Primary Examiner* — Rodney Amadiz
(74) *Attorney, Agent, or Firm* — CANTOR COLBURN LLP

(57) ABSTRACT

A display apparatus includes: pixels arranged in a display area, and a driving circuit arranged in a peripheral area outside the display area and for outputting a gate signal to the pixels. Each of the pixels includes: a driving transistor for outputting a driving current corresponding to a data signal, a light-emitting element for emitting light with luminance corresponding to the driving current, a first transistor diode-connecting the driving transistor, a second transistor for transmitting a first initialization voltage to a gate of the driving transistor, a third transistor for transmitting a driving voltage to the driving transistor, and a fourth transistor for transmitting a second initialization voltage to a pixel electrode of the light-emitting element. A third driving circuit for outputting a third gate signal to the third transistor and a fourth driving circuit for outputting a fourth gate signal to the fourth transistor share a clock line.

20 Claims, 27 Drawing Sheets

(56) References Cited

U.S. PATENT DOCUMENTS

| | | | | |
|---|---|---|---|---|
| 2023/0090058 | A1* | 3/2023 | Kim | H10K 59/131<br>257/211 |
| 2023/0176610 | A1* | 6/2023 | Kim | G06T 5/77<br>345/1.1 |
| 2023/0186860 | A1 | 6/2023 | In | |
| 2023/0368736 | A1* | 11/2023 | No | G09G 3/3233 |
| 2024/0005867 | A1* | 1/2024 | Lee | G09G 3/3233 |
| 2024/0185785 | A1 | 6/2024 | Kim et al. | |
| 2024/0194125 | A1 | 6/2024 | Park et al. | |

* cited by examiner

DISPLAY APPARATUS AND ELECTRONIC DEVICE INCLUDING THE SAME

This application claims priority to Korean Patent Application No. 10-2024-0090669, filed on Jul. 9, 2024, and all the benefits accruing therefrom under 35 U.S.C. § 119, the content of which in its entirety is herein incorporated by reference.

BACKGROUND

1. Field

One or more embodiments relate to a display apparatus including a pixel and a gate driving circuit configured to output a gate signal to the pixel.

2. Description of the Related Art

A display apparatus includes a pixel unit including a plurality of pixels, a gate driving circuit, and a data driving circuit. The gate driving circuit includes stages connected to gate lines, and the stages supply gate signals to the respective gate lines.

SUMMARY

One or more embodiments include a display apparatus in which power consumption is reduced by reducing the number of clock lines configured to supply a clock signal to a gate driving circuit.

Additional aspects will be set forth in part in the description which follows and, in part, will be apparent from the description, or may be learned by practice of the presented embodiments of the disclosure.

According to one or more embodiments, a display apparatus includes a plurality of pixels arranged in a display area, and a driving circuit arranged in a peripheral area outside the display area and outputting a gate signal to the plurality of pixels. Each of the plurality of pixels includes a driving transistor configured to output a driving current corresponding to a data signal, a light-emitting element configured to emit light with luminance corresponding to the driving current, a first transistor diode-connecting the driving transistor, a second transistor configured to transmit a first initialization voltage to a gate of the driving transistor, a third transistor configured to transmit a driving voltage to the driving transistor, and a fourth transistor configured to transmit a second initialization voltage to a pixel electrode of the light-emitting element. The driving circuit includes a first driving circuit configured to output a first gate signal to the first transistor, a second driving circuit configured to output a second gate signal to the second transistor, a third driving circuit configured to output a third gate signal to the third transistor, and a fourth driving circuit configured to output a fourth gate signal to the fourth transistor. The plurality of pixels operate in a first driving period during which light is emitted in response to a pre-written data signal, and a second driving period during which a new data signal is written and light is emitted in response to the new data signal. The third driving circuit is configured to output the third gate signal for turning the third transistor on in each of the first driving period and the second driving period, the fourth driving circuit is configured to output the fourth gate signal for turning the fourth transistor on in each of the first driving period and the second driving period, and the third driving circuit and the fourth driving circuit share a first clock line.

According to an embodiment, each of the third driving circuit and the fourth driving circuit may include a plurality of stages, the third gate signal output by each of the plurality of stages of the third driving circuit may be simultaneously supplied to third gate lines arranged on two or more rows, and the fourth gate signal output by each of the plurality of stages of the fourth driving circuit may be simultaneously supplied to fourth gate lines arranged on two or more rows.

According to an embodiment, the first clock line may include a pair of first-1 clock lines extending in a first direction and connected to odd stages from among the plurality of stages of the third driving circuit and odd stages from among the plurality of stages of the fourth driving circuit, and a pair of first-2 clock lines extending in the first direction and connected to even stages from among the plurality of stages of the third driving circuit and even stages from among the plurality of stages of the fourth driving circuit.

According to an embodiment, the display apparatus may further include a first connection line extending in a second direction perpendicular to the first direction and electrically connected to the first clock line, wherein the first connection line may include a pair of first-1 connection lines connected to the pair of first-1 clock lines, and a pair of first-2 connection lines connected to the pair of first-2 clock lines.

According to an embodiment, each of the odd stages of the third driving circuit may include first transistors connected to the pair of first-1 connection lines, each of the odd stages of the fourth driving circuit may include second transistors connected to the pair of first-1 connection lines, and the first transistors and the second transistors may be symmetrical with respect to a virtual line extending along the first direction and located between each of the plurality of stages of the third driving circuit and a corresponding stage of the fourth driving circuit.

According to an embodiment, the first connection line and the first clock line may be arranged on different layers from each other with an insulating layer therebetween, a plurality of contact holes in contact with the first connection line and the first clock line may be defined in the insulating layer, and from among the plurality of contact holes, a first contact hole in contact with one of the pair of first-1 clock lines and one of the pair of first-1 connection lines and a second contact hole in contact with another one of the pair of first-1 clock lines and another one of the pair of first-1 connection lines may be located on a virtual straight line extending along the second direction in a plan view.

According to an embodiment, from among the plurality of contact holes, a virtual straight line extending along the second direction and passing through a third contact hole in contact with one of the pair of first-2 clock lines and one of the pair of first-2 connection lines, and a virtual straight line extending along the second direction and passing through a fourth contact hole in contact with another one of the pair of first-2 clock lines and another one of the pair of first-2 connection lines may be parallel to each other in the plan view.

According to an embodiment, in a plan view, the first clock line may partially overlap each of the plurality of stages of the third driving circuit and each of the plurality of stages of the fourth driving circuit.

According to an embodiment, the first connection line may be arranged in the same layer as a source electrode and a drain electrode of a transistor arranged in the display area, and the first clock line may be arranged in the same layer as a data line and a driving voltage line of the display area.

According to an embodiment, the first connection line may be arranged in the same layer as a data line of the display area and the first clock line may be arranged in the same layer as a driving voltage line of the display area.

According to an embodiment, the third driving circuit and the fourth driving circuit may be arranged adjacent to one of a left side and a right side of the display area.

According to an embodiment, each of the first driving circuit and the second driving circuit may include a plurality of stages, the first gate signal output by each of the plurality of stages of the first driving circuit may be simultaneously supplied to first gate lines arranged on two or more rows, and the second gate signal output by each of the plurality of stages of the second driving circuit may be simultaneously supplied to second gate lines arranged on two or more rows.

According to an embodiment, each of the plurality of pixels may further include a fifth transistor configured to transmit the data signal to the driving transistor, the driving circuit may further include a fifth driving circuit configured to output a fifth gate signal to the fifth transistor, the fifth driving circuit may include a plurality of stages, and the fifth gate signal output by each of the plurality of stages of the fifth driving circuit may be supplied to a fifth gate line arranged on a corresponding row.

According to one or more embodiments, an electronic device includes: a plurality of pixels arranged in a display area, and a driving circuit arranged in a peripheral area outside the display area and configure to output a gate signal to the plurality of pixels. Each of the plurality of pixels includes a driving transistor configured to output a driving current corresponding to a data signal, a light-emitting element configured to emit light with luminance corresponding to the driving current, a first transistor diode-connecting the driving transistor, a second transistor configured to transmit a first initialization voltage to a gate of the driving transistor, a third transistor configured to transmit a driving voltage to the driving transistor, and a fourth transistor configured to transmit a second initialization voltage to a pixel electrode of the light-emitting element. The driving circuit includes a first driving circuit configured to output a first gate signal to the first transistor, a second driving circuit configured to output a second gate signal to the second transistor, a third driving circuit configured to output a third gate signal to the third transistor, and a fourth driving circuit configured to output a fourth gate signal to the fourth transistor. The plurality of pixels configured to operate in a first driving period during which light is emitted in response to a pre-written data signal, and a second driving period during which a new data signal is written and light is emitted in response to the new data signal. The first driving circuit may be configured to output the first gate signal for turning the first transistor on in the second driving period, the second driving circuit may be configured to output the second gate signal for turning the second transistor on in the second driving period, the third driving circuit may be configured to output the third gate signal for turning the third transistor on in each of the first driving period and the second driving period, and the fourth driving circuit may be configured to output the fourth gate signal for turning the fourth transistor on in each of the first driving period and the second driving period. The third driving circuit and the fourth driving circuit may share a first clock line.

According to an embodiment, each of the third driving circuit and the fourth driving circuit may include a plurality of stages, and the first clock line may include a pair of first-1 clock lines extending in a first direction and connected to odd stages from among the plurality of stages of the third driving circuit and odd stages from among the plurality of stages of the fourth driving circuit, and a pair of first-2 clock lines extending in the first direction and connected to even stages from among the plurality of stages of the third driving circuit and even stages from among the plurality of stages of the fourth driving circuit.

According to an embodiment, the electronic device may further include a first connection line extending in a second direction perpendicular to the first direction and electrically connected to the first clock line, wherein the first connection line may include a pair of first-1 connection lines connected to the pair of first-1 clock lines, and a pair of first-2 connection lines connected to the pair of first-2 clock lines.

According to an embodiment, the first connection line and the first clock line may be arranged on different layers from each other with an insulating layer therebetween, a plurality of contact holes in contact with the first connection line and the first clock line may be defined in the insulating layer, and from among the plurality of contact holes, a first contact hole in contact with one of the pair of first-1 clock lines and one of the pair of first-1 connection lines and a second contact hole in contact with another one of the pair of first-1 clock lines and another one of the pair of first-1 connection lines may be located on a virtual straight line extending along the second direction in a plan view.

According to an embodiment, from among the plurality of contact holes, a virtual straight line extending along the second direction and passing through a third contact hole in contact with one of the pair of first-2 clock lines and one of the pair of first-2 connection lines, from among the plurality of contact holes, and a virtual straight line extending along the second direction and passing through a fourth contact hole in contact with another one of the pair of first-2 clock lines and another one of the pair of first-2 connection lines may be parallel to each other in a plan view.

According to an embodiment, the first driving circuit and the second driving circuit may be arranged adjacent to one of a left side and a right side of the display area, and the third driving circuit and the fourth driving circuit may be arranged adjacent to another of the right side and the left side of the display area.

According to an embodiment, the first driving circuit and the second driving circuit may share a second clock line.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
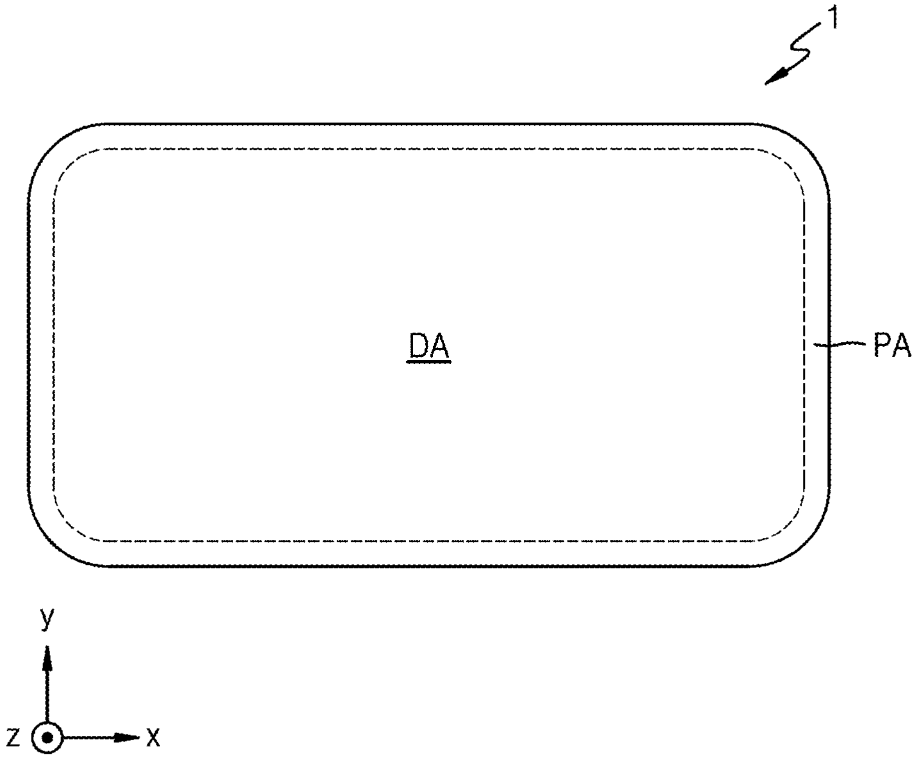
FIGS. 1A and 1B are diagrams schematically showing a display apparatus according to an embodiment.

The disclosure may have various modifications and various embodiments, and specific embodiments are illustrated in the drawings and are described in detail in the detailed description. Effects and features of the disclosure and methods of achieving the same will become apparent with reference to embodiments described in detail with reference to the drawings. However, the disclosure is not limited to the embodiments described below, and may be implemented in various forms.

In the following embodiments, the terms "first", "second", "first-1", "first-2", "second-1", "second-2", "first-first", "first-second", "second-first" etc. are not used in a limited sense and are used to distinguish one component from another component.

In the following embodiments, an expression used in the singular encompasses the expression of the plural, unless it has a clearly different meaning in the context.

In the following embodiments, it will be further understood that the terms "comprise" and/or "comprising" used herein specify the presence of stated features or components, but do not preclude the presence or addition of one or more other features or components.

In the specification, "A and/or B" denotes only A, only B, or both A and B. Also, in the present specification, "at least one of A and B" denotes only A, only B, or both A and B.

According to embodiments, a case where X and Y are connected to each other may include, directly or indirectly, a case where X and Y are electrically connected to each other, a case where X and Y are functionally connected to each other, and a case where X and Y are physically connected to each other. Here, X and Y may be objects (for example, apparatuses, devices, circuits, wires, electrodes, terminals, conductive layers, or layers). Accordingly, such a connection is not limited to a certain connection relationship, for example, a connection relationship indicated in drawings or detailed description, and may include connection relationships other than that indicated in the drawings or detailed description.

A case where X and Y are electrically connected to each other may include, for example, a case where X and Y are directly electrically connected to each other and a case where one or more elements (e.g., a switch, a transistor, a capacitor, an inductor, a resistor, and a diode) enabling an electric connection between X and Y are connected between X and Y.

It will be understood that when an element is referred to as being "on" another element, it can be directly on the other element or intervening elements may be present therebetween. In contrast, when an element is referred to as being "directly on" another element, there are no intervening elements present.

According to embodiments, the term "on" used in association with a device state may refer to an activated state of a device, and the term "off" may refer to a deactivated state of the device. The term "on" used in association with a signal received by a device may refer to a signal activating the device, and the term "off" may refer to a signal deactivating the device. A device may be activated by a voltage of a high level or a low level. For example, a P-channel transistor (P-type transistor) may be activated by a low-level voltage, and an N-channel transistor (N-type transistor) may be activated by a high-level voltage. Accordingly, it should be understood that "on" voltages for the P-type transistor and the N-type transistor are opposite voltage levels (low versus high).

According to embodiments, an x direction, a y direction, and a z direction are not limited to directions in three axes on an orthogonal coordinate system, but may be interpreted in a broad sense including the three axes. For example, the x direction, the y direction, and the z direction may be perpendicular to one another, or may represent different directions that are not perpendicular to one another. Here, z direction may be a thickness direction of the display apparatus 1 (e.g., the substrate 100).

Hereinafter, embodiments will be described in detail with reference to the accompanying drawings, and in the following description with reference to the drawings, like reference numerals refer to like components and redundant descriptions thereof will be omitted.

Figure 1B:
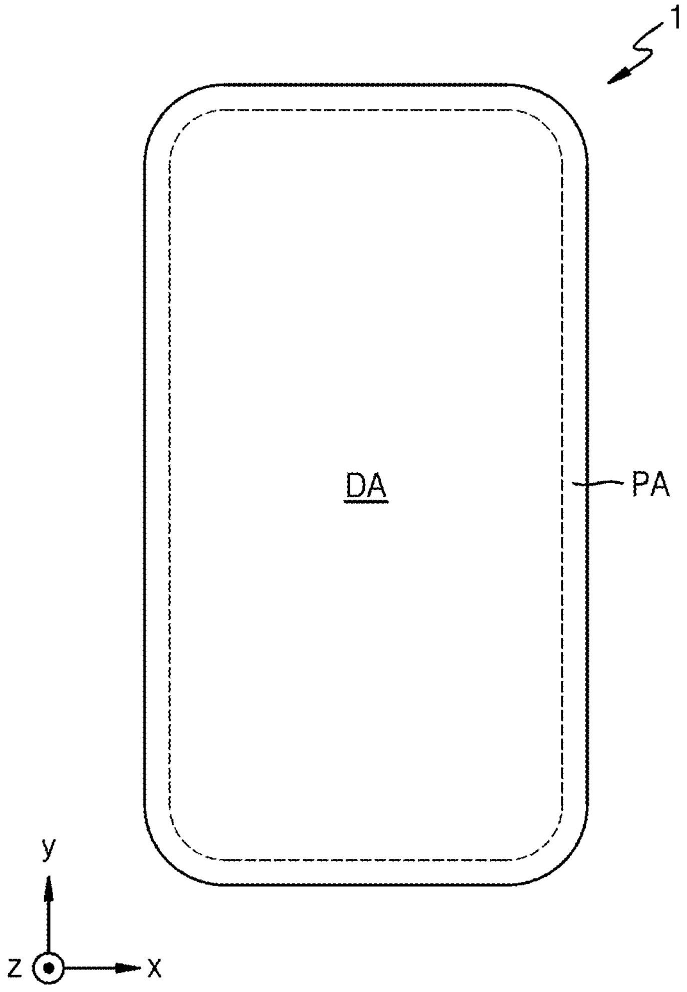
Figure 2:
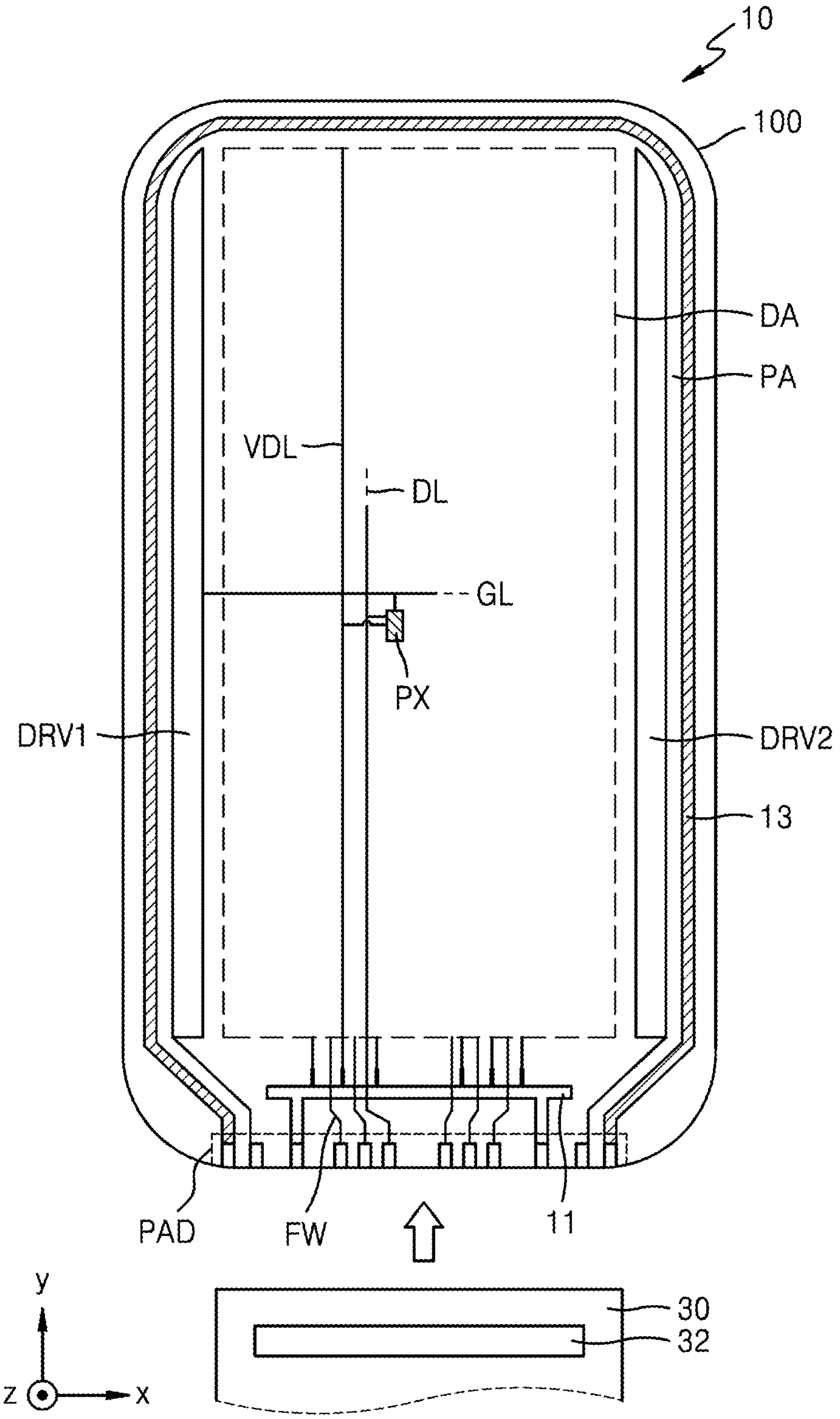
FIG. 2 is a diagram schematically showing the display apparatus according to an embodiment.

FIGS. 1A and 1B are diagrams schematically showing a display apparatus 1 according to an embodiment. FIG. 2 is a diagram schematically showing the display apparatus 1 according to an embodiment.

Referring to FIGS. 1A and 1B, the display apparatus 1 may include a display area DA wherein an image is displayed and a peripheral area PA outside the display area DA. The display area DA may be entirely surrounded by the peripheral area PA.

When the display area DA is viewed in a plane, the display area DA may have a rectangular shape. According to another embodiment, the display area DA may have a polygonal shape, such as a triangle, a pentagon, or a hexagon, or may have a circular shape, an oval shape, or an atypical shape. The display area DA may have a round shape at a corner of an edge. According to an embodiment, the display apparatus 1 may include the display area DA in which a length in an x direction is longer than a length in a y direction, as shown in FIG. 1A. According to another embodiment, the display apparatus 1 may include the display area DA in which the length in the y direction is longer than the length in the x direction, as shown in FIG. 1B.

Referring to FIG. 2, the display apparatus 1 may include a display panel 10 and various components configuring the display panel 10 may be arranged on a substrate 100. The substrate 100 may include the display area DA and the peripheral area PA surrounding the display area DA.

A plurality of pixels PX may be arranged in the display area DA. A plurality of gate lines GL, a plurality of data lines DL, and the plurality of pixels PX connected thereto may be arranged in the display area DA. The plurality of pixels PX may be arranged in various forms, such as a stripe arrangement, a pentile arrangement, a diamond arrangement, and a mosaic arrangement, to realize an image. Each pixel PX may include an organic light-emitting diode OLED as a display element (light-emitting element), and the organic light-emitting diode OLED may be connected to a pixel circuit. The pixel circuit may include a plurality of transistors and at least one capacitor. The pixel PX may be configured to emit, for example, red, green, blue, or white light through the organic light-emitting diode OLED. Each pixel PX may be connected to a corresponding gate line GL from among the plurality of gate lines GL, and a corresponding data line DL from among the plurality of data lines DL.

The gate lines GL may each extend in the x direction (a row direction) and be connected to the pixels PX located in the same row. The gate lines GL may each be configured to transmit a gate signal to the pixels PX in the same row. The data lines DL may each extend in the y direction (a column direction) and be connected to the pixels PX located in the same column. The data lines DL may each be configured to transmit a data signal to each of the pixels PX in the same column, in synchronization with the gate signal. Each pixel PX may be connected to a driving voltage line VDL to receive a first driving voltage ELVDD of FIG. 7. The driving voltage lines VDL may each extend in the y direction (column direction) to be connected to the pixels PX located in the same column.

In FIG. 2, the pixel PX is connected to one gate line GL, but an embodiment is not limited thereto. The pixel PX may be connected to one or more gate lines GL.

Each of the pixel circuits configured to drive the pixels PX may be electrically connected to outer circuits arranged in the peripheral area PA. A first gate driving circuit DRV1, a second gate driving circuit DRV2, a terminal portion PAD, a first driving voltage supply line 11, and a second driving voltage supply line 13 may be arranged in the peripheral area PA.

According to an embodiment, the peripheral area PA may be a type of non-display area in which the pixels PX are not arranged. According to another embodiment, a portion of the peripheral area PA may be embodied as the display area DA. For example, the plurality of pixels PX may be arranged by overlapping the outer circuit, in at least one corner of the peripheral area PA. Accordingly, a dead area may be reduced and the display area DA may be expanded.

The first gate driving circuit DRV1 and the second gate driving circuit DRV2 may include a plurality of driving circuits, and the plurality of driving circuits may be connected to the plurality of gate lines GL and apply, through the gate lines GL, a gate signal to each of pixel circuits driving the pixels PX. The second gate driving circuit DRV2 may be located on an opposite side of the first gate driving circuit DRV1, based on the display area DA, and may be approximately parallel to the first gate driving circuit DRV1. According to an embodiment, the pixel circuits of the pixels PX of the display area DA may be electrically connected to the first gate driving circuit DRV1 and the second gate driving circuit DRV2. According to another embodiment, some of the pixel circuits of the pixels PX of the display area DA may be electrically connected to the first gate driving circuit DRV1, and the remaining pixel circuits may be electrically connected to the second gate driving circuit DRV2. According to another embodiment, the second gate driving circuit DRV2 may be omitted.

The terminal portion PAD may be arranged at one side of the substrate 100. The terminal portion PAD may not be covered by an insulating layer, but may be exposed and connected to a display circuit board 30. A display driving unit 32 may be arranged in the display circuit board 30.

The display driving unit 32 includes a data driving circuit, wherein the data driving circuit may be connected to the plurality of data lines DL and configured to generate data signals, and the generated data signals may be transmitted to the pixel circuits of the pixels PX through fanout lines FW and the data lines DL connected to the fanout lines FW.

The display driving unit 32 includes a power supply circuit, wherein the power supply circuit may be configured to supply the first driving voltage ELVDD to the first driving voltage supply line 11 and supply a second driving voltage ELVSS of FIG. 7 to the second driving voltage supply line 13. The first driving voltage ELVDD may be applied to the pixel circuits of the pixels PX through the driving voltage line VDL connected to the first driving voltage supply line 11, and the second driving voltage ELVSS may be applied to an opposite electrode of the display element through the second driving voltage supply line 13.

The display driving unit 32 includes a controller, wherein the controller may be configured to generate a control signal transmitted to the first gate driving circuit DRV1, the second gate driving circuit DRV2, the data driving circuit, and the power supply circuit.

The first driving voltage supply line 11 may be connected to the terminal portion PAD and may extend in the x direction from below the display area DA. The second driving voltage supply line 13 may be connected to the terminal portion PAD and may partially surround the display area DA by having a loop shape in which one side is opened.

A portion or all of the first gate driving circuit DRV1 and second gate driving circuit DRV2 may be directly formed in the peripheral area PA of the substrate 100 during a process of forming the pixel circuit in the display area DA of the substrate 100. The display driving unit 32 may be disposed on the display circuit board 30 that is formed in the form of one integrated circuit chip and electrically connected to the terminal portion PAD arranged on one side of the substrate 100. The display circuit board 30 may be a flexible printed circuit board ("FPCB"). According to another embodiment, the display driving unit 32 may be directly disposed on the substrate 100 in a chip-on-glass ("COG") or chip-on-plastic ("COP") manner.

According to an embodiment, some of the plurality of transistors included in the pixel circuits of the display area DA and a plurality of transistors included in the outer circuits, for example, the first gate driving circuit DRV1 and the second gate driving circuit DRV2, of the peripheral area PA may be P-type silicon thin-film transistors, and the remainder thereof may be N-type oxide thin-film transistors. The plurality of transistors included in the outer circuits of the peripheral area PA and the plurality of transistors included in the pixel circuits of the display area DA may be simultaneously formed through the same process. According to another embodiment, the plurality of transistors included in the pixel circuits of the display area DA may be N-type oxide thin-film transistors, and the plurality of transistors included in the outer circuits of the peripheral area PA may be P-type silicon thin-film transistors. According to another embodiment, the plurality of transistors included in the pixel circuits of the display area DA and the plurality of transistors included in the outer circuits of the peripheral area PA may be N-type oxide thin-film transistors.

A semiconductor layer of an oxide thin-film transistor may include an oxide. An oxide semiconductor may include, as a zinc (Zn) oxide-based material, a Zn oxide, an indium (In)—Zn oxide, or a gallium (Ga)—In—Zn oxide. According to some embodiments, the oxide semiconductor may be an In—Ga—Zn—O ("IGZO") semiconductor, in which metals, such as In and Ga, are contained in zinc oxide (ZnO). According to an embodiment, an oxide thin-film transistor may be a low temperature polycrystalline oxide ("LTPO") thin-film transistor. A silicon thin-film transistor may be a low temperature poly-silicon ("LTPS") thin-film transistor, in which a semiconductor layer includes amorphous silicon or polysilicon.

Figure 3A:
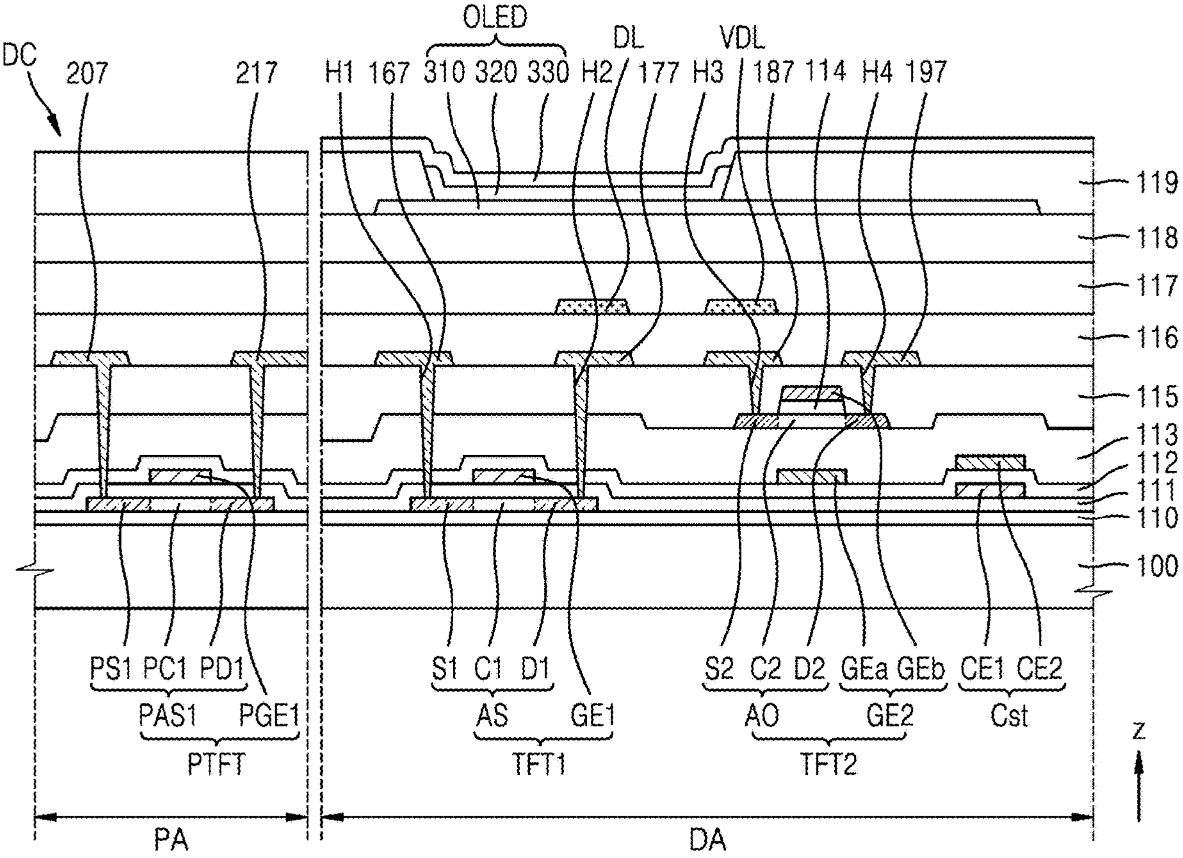
FIGS. 3A and 3B are cross-sectional views of a portion of a display area and a portion of a peripheral area of the display apparatus, according to an embodiment.
Figure 3B:
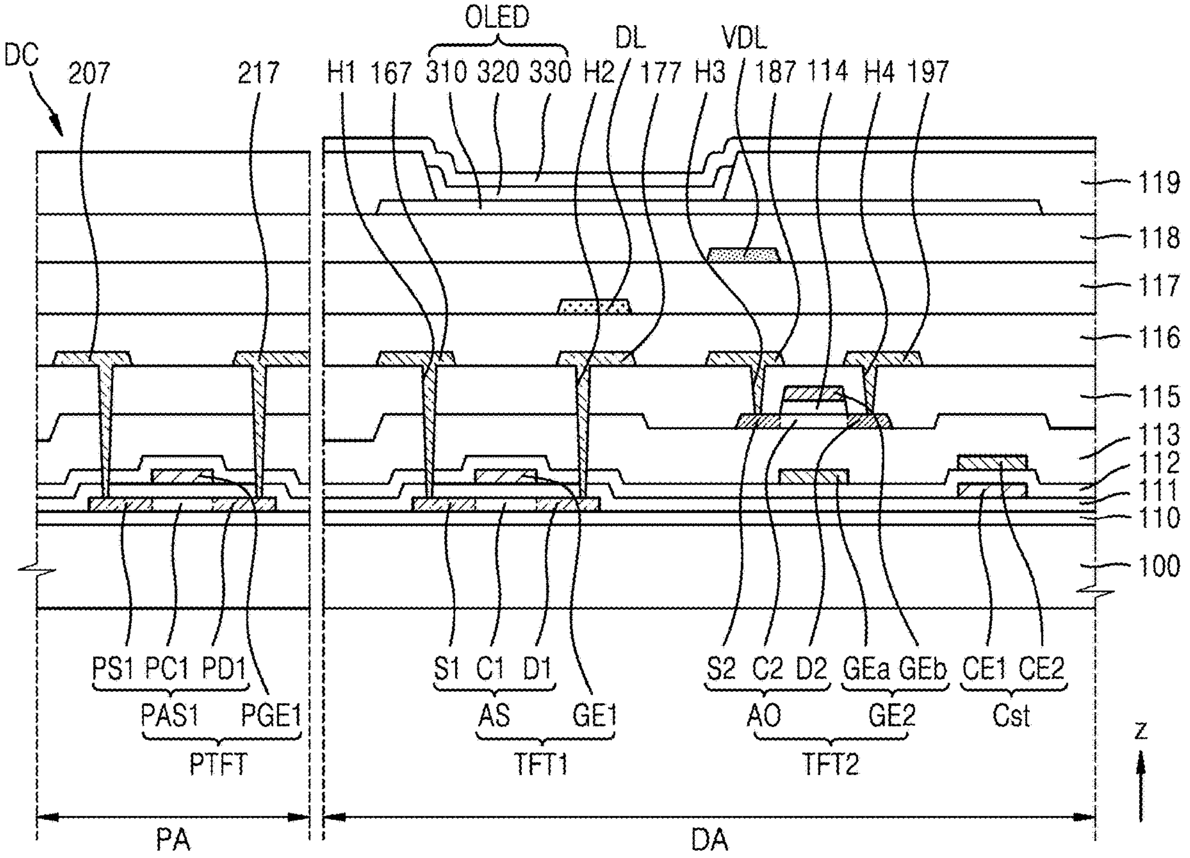

FIGS. 3A and 3B are cross-sectional views of a portion of the display area DA and a portion of the peripheral area PA of a display apparatus, according to an embodiment.

The display apparatus may include the substrate 100, where the pixel PX may be arranged in the display area DA of the substrate 100 and a driving circuit DC may be arranged in the peripheral area PA.

Referring to FIGS. 3A and 3B, the pixel PX of the display area DA may include a first thin-film transistor TFT1 including a silicon semiconductor, a second thin-film transistor TFT2 including an oxide semiconductor, and a storage capacitor Cst.

The substrate 100 may include a glass material, a ceramic material, a metal material, or a flexible or bendable material. When the substrate 100 is flexible or bendable, the substrate 100 may include a polymer resin such as polyethersulfone ("PES"), polyarylate, polyetherimide ("PEI"), polyethylene naphthalate ("PEN"), polyethylene terephthalate ("PET"), polyphenylene sulfide ("PPS"), polyarylate, polyimide ("PI"), polycarbonate ("PC"), or cellulose acetate propionate ("CAP"). The substrate 100 may have a single layer or multilayer structure of such a material, and may further include an inorganic layer in case of the multilayer structure. According to some embodiments, the substrate 100 may have a structure of an organic material/inorganic material/organic material.

A buffer layer 110 may increase smoothness of a top surface of the substrate 100 and may include an oxide layer such as silicon oxide (SiOx), a nitride layer such as silicon nitride (SiNx), or silicon oxynitride (SiON).

A barrier layer (not shown) may be further provided between the substrate 100 and the buffer layer 110. The barrier layer may prevent or minimize penetration of impurities from the substrate 100 to a silicon semiconductor layer. The barrier layer may include an inorganic material, such as an oxide or a nitride, and/or an organic material, and may have a single layer or multilayer structure of an inorganic material and an organic material.

A first semiconductor layer ATS of the first thin-film transistor TFT1, including a silicon semiconductor, may be disposed on the buffer layer 110. The first semiconductor layer ATS may include a source region S1 and a drain region D1, which are doped with impurities, have conductivity, and are spaced apart from each other, and a channel region C1 arranged therebetween. The source region S1 and the drain region D1 may correspond to a source electrode and a drain electrode of the first thin-film transistor TFT1, respectively, and positions of the source region S1 and the drain region D1 may be switched.

A gate electrode GE1 of the first thin-film transistor TFT1 may be disposed on the first semiconductor layer AS and a first insulating layer 111 may be provided between the first semiconductor layer AS and the gate electrode GE1.

The first insulating layer 111 may include an inorganic material including an oxide or a nitride. For example, the first insulating layer 111 may include silicon oxide ($SiO_2$), silicon nitride (SiNx), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_2$).

The gate electrode GE1 of the first thin-film transistor TFT1 may overlap the channel region C1 of the first semiconductor layer AS, include molybdenum (Mo), copper (Cu), or titanium (Ti), and be a single layer or multilayer.

A first electrode CE1 of the storage capacitor Cst may be arranged on the same layer as the gate electrode GE1 of the first thin-film transistor TFT1. The first electrode CE1 of the storage capacitor Cst may include the same material as the gate electrode GE1 of the first thin-film transistor TFT1. For example, the first electrode CE1 of the storage capacitor Cst may include Mo, Cu, or Ti and may be a single layer or multilayer.

A second insulating layer 112 may be disposed on the gate electrode GE1 of the first thin-film transistor TFT1 and the first electrode CE1 of the storage capacitor Cst.

The second insulating layer 112 may include an inorganic material including an oxide or a nitride. For example, the second insulating layer 112 may include $SiO_2$, SiNx, SiON, $Al_2O_3$, $TiG_2$, $Ta_2O_5$, $HfG_2$, or $ZnG_2$.

A second electrode CE2 of the storage capacitor Cst may be disposed on the second insulating layer 112 to overlap the first electrode CE1 of the storage capacitor Cst. The second electrode CE2 may include Mo, Cu, or Ti, and may be a single layer or multilayer.

A third insulating layer 113 may be disposed on the second electrode CE2 of the storage capacitor Cst.

The third insulating layer 113 may include an inorganic material including an oxide or a nitride. For example, the third insulating layer 113 may include $SiO_2$, SiNx, SiON, $Al_2O_3$, $TiG_2$, $Ta_2O_5$, $HfG_2$, or $ZnG_2$.

In FIGS. 3A and 3B, the storage capacitor Cst is spaced apart from the first thin-film transistor TFT1, but according to another embodiment, the storage capacitor Cst may overlap the first thin-film transistor TFT1. For example, the second electrode CE2 may be disposed above the gate electrode GE1 of the first thin-film transistor TFT1 to overlap the gate electrode GE1. In this case, the gate electrode GE1 of the first thin-film transistor TFT1 may not only perform a function as a gate electrode, but also perform a function as the first electrode CE1 of the storage capacitor Cst.

A second semiconductor layer AO of the second thin-film transistor TFT2, including an oxide semiconductor, may be disposed on the third insulating layer 113. The second semiconductor layer AO may include a source region S2 and a drain region D2, which have conductivity and are spaced apart from each other, and a channel region C2 arranged between the source region S2 and the drain region D2. An oxide semiconductor may include, as a Zn oxide-based material, a Zn oxide, an In—Zn oxide, or a Ga—In—Zn oxide. For example, the second semiconductor layer AO may include an In—Ga—Zn—O (IGZO), In—Sn—Zn—O ("ITZO"), or an In—Ga—Sn—Zn—O ("IGTZO") semiconductor, wherein a metal, such indium (In), gallium (Ga), or tin (Sn), is contained in ZnO. The source region S2 and drain region D2 of the second semiconductor layer AO may be formed by conducting an oxide semiconductor by adjusting carrier concentration thereof. For example, the source region S2 and drain region D2 may be formed by increasing the carrier concentration by performing a plasma process on the oxide semiconductor by using a hydrogen (H)-based gas, a fluorine (F)-based gas, or a combination thereof.

A first gate electrode GEa may be arranged below the second semiconductor layer AO of the second thin-film transistor TFT2, and a second gate electrode GEb may be arranged above the second semiconductor layer AO of the second thin-film transistor TFT2. In other words, a gate electrode GE2 of the second thin-film transistor TFT2 may have a dual gate electrode structure. The third insulating layer 113 may be provided between the second semiconductor layer AO and the first gate electrode GEa of the second thin-film transistor TFT2. The first gate electrode GEa of the second thin-film transistor TFT2 may be formed of the same material and on the same layer as the second electrode CE2 of the storage capacitor Cst. The channel region C2 of the second semiconductor layer AO may overlap the first gate electrode GEa of the second thin-film transistor TFT2.

A fourth insulating layer 114 may be arranged between the second gate electrode GEb and the second semiconductor layer AO of the second thin-film transistor TFT2. The second gate electrode GEb may overlap the channel region C2 of the second semiconductor layer AO. The fourth insulating layer 114 may be formed through the same mask process as the second gate electrode GEb and in this case, the fourth insulating layer 114 may have the same shape as the second gate electrode GEb.

The fourth insulating layer 114 may include an inorganic material including an oxide or a nitride. For example, the fourth insulating layer 114 may include $SiO_2$, SiNx, SiON, $Al_2O_3$, $TiG_2$, $Ta_2O_5$, $HfG_2$, or $ZnG_2$. The second gate electrode GEb may include Mo, Cu, or Ti, and may be a single layer or multilayer.

A fifth insulating layer 115 may be arranged while covering the second thin-film transistor TFT2. The fifth insulating layer 115 may be disposed on the second gate electrode GEb, and a first source electrode 167, a first drain electrode 177, a second source electrode 187, and a second drain electrode 197 may be disposed on the fifth insulating layer 115.

The fifth insulating layer 115 may include an inorganic material including an oxide or a nitride. For example, the fifth insulating layer 115 may include $SiO_2$, SiNx, SiON, $Al_2O_3$, $TiG_2$, $Ta_2O_5$, $HfG_2$, or $ZnG_2$.

The first source electrode 167, the first drain electrode 177, the second source electrode 187, and the second drain electrode 197 may include a material with high conductivity, such as a metal or a conductive oxide. For example, the first source electrode 167, the first drain electrode 177, the second source electrode 187, and the second drain electrode 197 may be a single layer or multilayer including aluminum (Al), Cu, or Ti. According to some embodiments, the first source electrode 167, the first drain electrode 177, the second source electrode 187, and the second drain electrode 197 may be a triple layer of Ti, Al, and Ti (Ti/Al/Ti) arranged sequentially.

The first source electrode 167 may be connected to the first semiconductor layer AS through a first contact hole H1 and the first drain electrode 177 may be connected to the first semiconductor layer AS through a second contact hole H2. The first contact hole H1 and the second contact hole H2 may penetrate through the first insulating layer 111, the second insulating layer 112, the third insulating layer 113, and the fifth insulating layer 115 to expose a portion of the first semiconductor layer AS. A portion of the first source electrode 167 may be inserted into the first contact hole H1 and a portion of the first drain electrode 177 may be inserted into the second contact hole H2 to be electrically connected to the first semiconductor layer AS.

The second source electrode 187 may be connected to the second semiconductor layer AO through a third contact hole H3 and the second drain electrode 197 may be connected to the second semiconductor layer AO through a fourth contact hole H4. The third contact hole H3 and the fourth contact hole H4 may penetrate through the fifth insulating layer 115 and expose a portion of the second semiconductor layer AO. A portion of the second source electrode 187 may be inserted into the third contact hole H3 and a portion of the second semiconductor layer AO may be inserted into the fourth contact hole H4 to be electrically connected to the second semiconductor layer AO.

A sixth insulating layer 116 that is a planarization layer may be disposed on the first source electrode 167, the first drain electrode 177, the second source electrode 187, and the second drain electrode 197. The sixth insulating layer 116 may include an organic material such as acryl, benzo cyclobutene ("BCB"), polyimide, or hexamethyldisiloxane ("HMDSO"). Alternatively, the sixth insulating layer 116 may include an inorganic material. The sixth insulating layer 116 functions as a protection layer covering the first thin-film transistor TFT1 and the second thin-film transistor TFT2, and a top portion of the sixth insulating layer 116 may be flat. The sixth insulating layer 116 may be provided in a single layer or a multilayer.

According to an embodiment, referring to FIG. 3A, the data line DL and the driving voltage line VDL may be disposed on the sixth insulating layer 116. In other words, the data line DL and the driving voltage line VDL may be arranged on the same layer. In this case, a seventh insulating layer 117 may be disposed on the data line DL and the driving voltage line VDL.

According to an embodiment, referring to FIG. 3B, the data line DL may be disposed on the sixth insulating layer 116, the seventh insulating layer 117 may be disposed on the data line DL, and the driving voltage line VDL may be disposed on the seventh insulating layer 117. In other words, the data line DL and the driving voltage line VDL may be arranged on different layers.

The data line DL and the driving voltage line VDL may include a conductive material such as a metal or a conductive oxide. For example, the data line DL and the driving voltage line VDL may include Al, Cu, or Ti, and may be in a single layer or multilayer.

The organic light-emitting diode OLED may be disposed on an eighth insulating layer 118. The organic light-emitting diode OLED may include a pixel electrode 310, an opposite electrode 330, and an intermediate layer 320 including an emission layer and provided between the pixel electrode 310 and the opposite electrode 330.

A pixel-defining layer 119 may be disposed on the pixel electrode 310. The pixel-defining layer 119 may define a pixel by including an opening corresponding to each pixel, i.e., an opening exposing a portion of the pixel electrode 310. The pixel-defining layer 119 may include an organic material, for example, polyimide or HMDSO.

Figure 4:
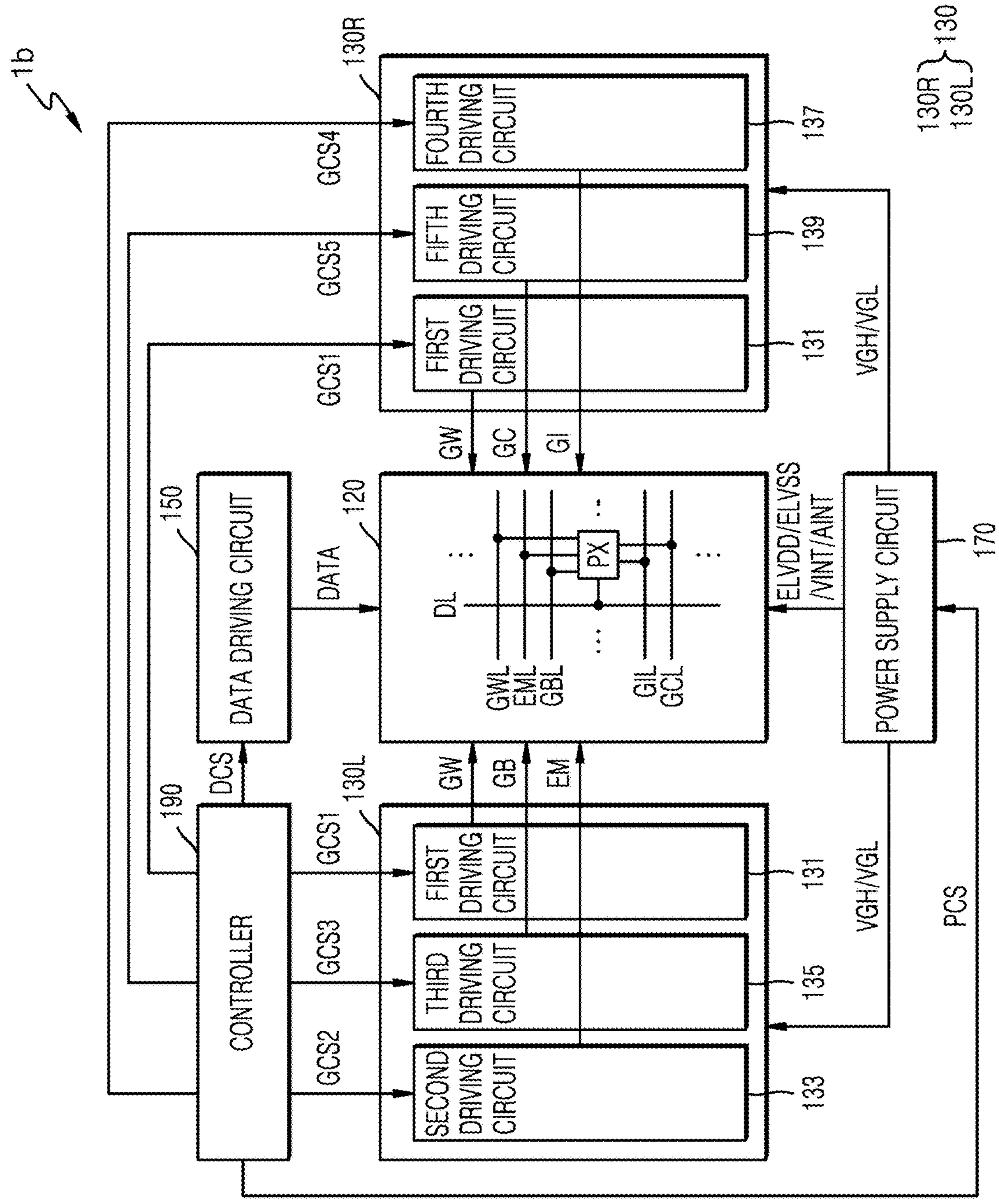
FIG. 4 is a diagram schematically showing a display apparatus according to an embodiment.

The driving circuit DC of the peripheral area PA may be a portion of the first gate driving circuit DRV1 and second gate driving circuit DRV2 of FIG. 2 and a gate driving circuit 130 of FIG. 4. For example, the driving circuit DC may be one of a plurality of stages included in the gate driving circuit 130 described below.

The driving circuit DC may include a third thin-film transistor PTFT. The third thin-film transistor PTFT may be one of a plurality of transistors included in a stage. The third thin-film transistor PTFT may be formed simultaneously when the first thin-film transistor TFT1 of the display area DA is formed.

The third thin-film transistor PTFT may include a first semiconductor layer PAS1 including silicon and a first gate electrode PGE1. The first semiconductor layer PAS1 may include a source region PS1 and a drain region PD1, which are doped with impurities, have conductivity, and are spaced apart from each other, and a channel region PC1 arranged therebetween. The first gate electrode PGE1 may overlap the channel region PC1 of the first semiconductor layer PAS1.

FIG. 4 is a diagram schematically showing a display apparatus 1*b* according to an embodiment. The display apparatus 1*b* of FIG. 4 may be an embodiment of the display apparatus 1 of FIGS. 1A and 1B. As shown in FIG. 4, the display apparatus 1*b* may include a pixel region 120, the gate driving circuit 130, a data driving circuit 150, a power supply circuit 170, and a controller 190.

The pixel region 120 may be provided in the display area DA. Various conductive lines configured to transmit an electrical signal to be applied to the display area DA, outer circuits electrically connected to pixel circuits, and pads to which a printed circuit board or a driver integrated circuit ("IC") chip is attached may be located in the peripheral area PA. For example, the gate driving circuit 130, the data driving circuit 150, the power supply circuit 170, and the controller 190 may be provided in the peripheral area PA.

A plurality of gate lines may be spaced apart from each other in the y direction (for example, the column direction) at regular intervals, in the pixel region 120. The gate lines may each extend in the x direction (for example, the row direction) and be connected to the pixels PX located in the same row (a row line). For example, the gate lines may include first gate lines GWL, second gate lines EML, third gate lines GBL, fourth gate lines GIL, and fifth gate lines GCL, wherein the first gate lines GWL, the second gate lines EML, the third gate lines GBL, the fourth gate lines GIL, and the fifth gate lines GCL may be arranged in each row.

A plurality of data lines may be spaced apart from each other in the x direction at regular intervals, in the pixel region 120. The data lines may each extend in the y direction and be connected to the pixels PX located in the same column (a column line).

The gate driving circuit 130 may be connected to the gate lines and configured to apply a gate signal sequentially to the gate lines. The gate line may be connected to a gate of a transistor included in the pixel PX. The gate signal may be a gate control signal controlling on or off of the transistor. The gate signal may be a signal including a gate-on voltage for turning the transistor on, and a gate-off voltage for turning the transistor off. According to an embodiment, a gate-on voltage may be a low-level voltage (first level voltage) or a high-level voltage (second level voltage).

The gate driving circuit 130 may include a first gate driving circuit unit 130L arranged on a left side of the pixel region 120 and a second gate driving circuit unit 130R arranged on a right side of the pixel region 120. The first gate driving circuit unit 130L may be an example of the first gate driving circuit DRV1 of FIG. 2, and the second gate driving circuit unit 130R may be an example of the second gate driving circuit DRV2 of FIG. 2. According to an embodiment, the first gate driving circuit unit 130L may include a first driving circuit 131, a second driving circuit 133, and a third driving circuit 135, and the second gate driving circuit unit 130R may include the first driving circuit 131, a fourth driving circuit 137, and a fifth driving circuit 139. However, an embodiment is not limited thereto, and each driving circuit may be located on the left side or the right side of the pixel region 120 in another embodiment. For example, the second driving circuit 133 and the third driving circuit 135 may be located on the left side or the right side of the display area DA, and the fourth driving circuit 137 and the fifth driving circuit 139 may be located on the right side or the left side of the display area DA.

The first driving circuit 131 may be connected to the plurality of first gate lines GWL, and configured to supply a first gate signal GW sequentially to the first gate lines GWL according to a first control signal GCS1. The second driving circuit 133 may be connected to the plurality of second gate lines EML, and configured to supply a second gate signal EM sequentially to the second gate lines EML according to a second control signal GCS2. The third driving circuit 135 may be connected to the plurality of third gate lines GBL, and configured to supply a third gate signal GB sequentially to the third gate lines GBL according to a third control signal GCS3. The fourth driving circuit 137 may be connected to the plurality of fourth gate lines GIL, and configured to supply a fourth gate signal GI sequentially to the fourth gate lines GIL according to a fourth control signal GCS4. The fifth driving circuit 139 may be connected to the plurality of fifth gate lines GCL, and configured to supply a fifth gate signal GC sequentially to the fifth gate lines GCL according to a fifth control signal GCS5.

The data driving circuit 150 may be connected to the plurality of data lines DL, and configured to apply a data signal DATA indicating a grayscale to the data lines DL according to a sixth control signal DCS. The data driving circuit 150 may be configured to convert input image data having a grayscale input from the controller 190 into the data signal DATA in the form of a voltage or current.

The power supply circuit 170 may be configured to generate voltages to drive the pixel PX, according to a seventh control signal PCS. For example, the power supply circuit 170 may be configured to generate the first driving voltage ELVDD and the second driving voltage ELVSS, and supply the same to the pixels PX. The first driving voltage ELVDD may be a high-level voltage provided to one electrode of a driving transistor connected to a first electrode (a pixel electrode or anode) of a display element included in the pixel PX. The second driving voltage ELVSS may be a low-level voltage provided to a second electrode (an opposite electrode or cathode) of the display element included in the pixel PX. The power supply circuit 170 may be configured to generate a first initialization voltage VINT and a second initialization voltage AINT, and supply the same to the pixels PX. A voltage level of the first driving voltage ELVDD may be greater than a voltage level of the second driving voltage ELVSS. Voltage levels of the first initialization voltage VINT and second initialization voltage AINT may be lower than the voltage level of the second driving voltage ELVSS.

The power supply circuit 170 may be configured to generate a first voltage VGH and a second voltage VGL, which are to drive the gate driving circuit 130, and transmit the same to the gate driving circuit 130. A voltage level of the first voltage VGH may be greater than a voltage level of the second voltage VGL.

Figure 5:
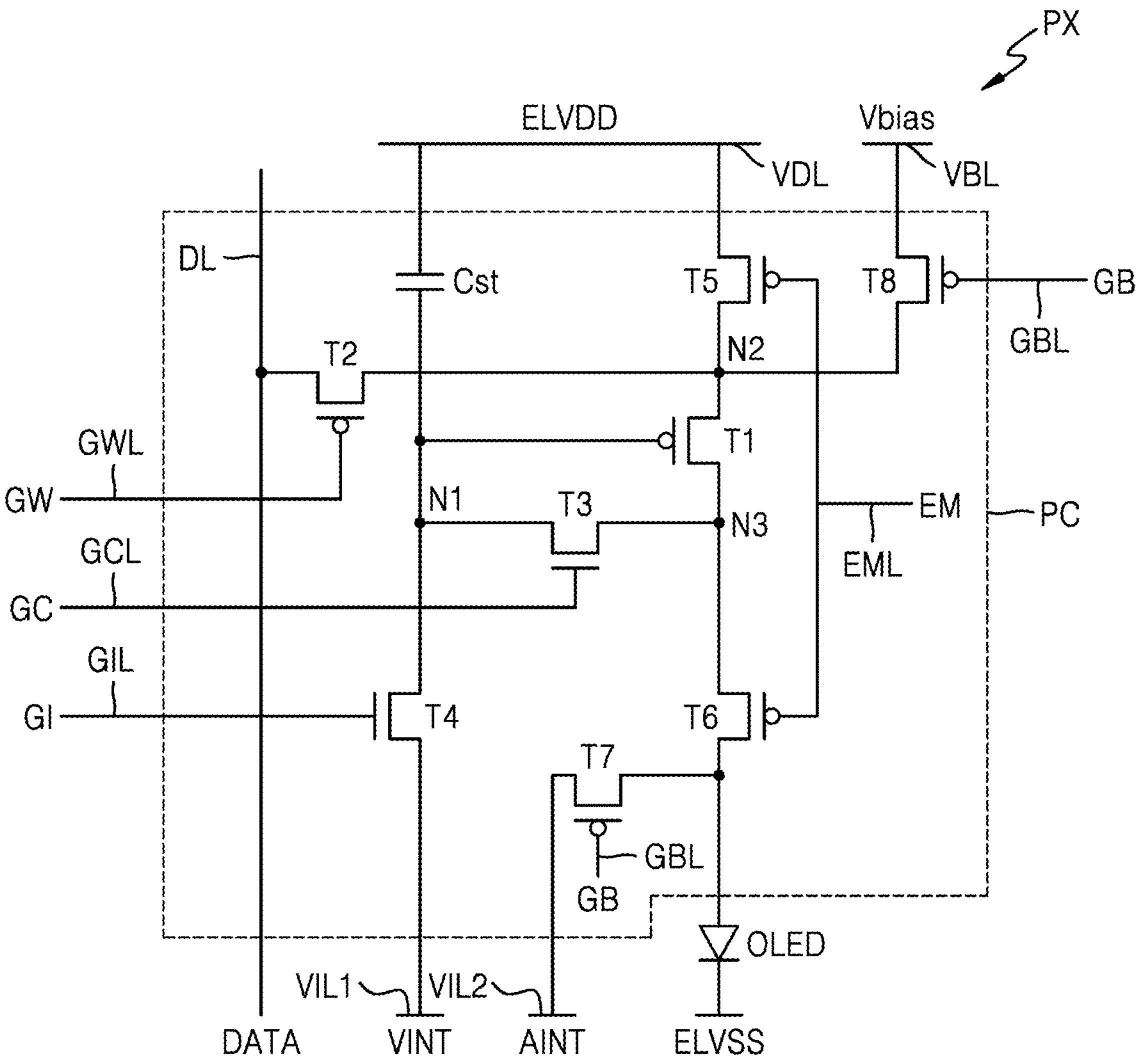
FIG. 5 is an equivalent circuit diagram of a pixel according to an embodiment.

FIG. 5 is an equivalent circuit diagram of the pixel PX according to an embodiment.

Referring to FIG. 5, the pixel PX may include a pixel circuit PC and the organic light-emitting diode OLED, as a display element, connected to the pixel circuit PC.

The pixel circuit PC of the pixel PX may include first to eighth transistors T1 to T8, the storage capacitor Cst, and signal lines connected thereto. The signal lines may include the data line DL, the first gate line GWL, the second gate line EML, the third gate line GBL, the fourth gate line GIL, the fifth gate line GCL, the driving voltage line VDL, a bias voltage line VBL, a first initialization voltage line VIL1, and a second initialization voltage line VIL2.

The first transistor T1 may be a "driving transistor" in which a source-drain current is determined according to a gate-source voltage, and the second to eighth transistors T2 to T8 may be switching transistors that are turned on/off according to the gate-source voltage, substantially, a gate voltage. The first to eighth transistors T1 to T8 may be embodied as thin-film transistors. A first terminal of each of the first to eighth transistors T1 to T8 may be a source or a drain, and a second terminal thereof may be a terminal different from the first terminal, depending on a transistor type (p-type or n-type) and/or an operating condition. For example, when the first terminal is a source, the second terminal may be a drain.

The first transistor T1, the second transistor T2, and the fifth to eighth transistors T5 to T8 may be P-type silicon thin-film transistors, and the third transistor T3 and the fourth transistor T4 may be N-type oxide thin-film transistors. According to an embodiment, the first transistor T1, the second transistor T2, and the fifth to eighth transistors T5 to T8 may be formed like the first thin-film transistor TFT1 illustrated in FIGS. 3A and 3B. The third transistor T3 and the fourth transistor T4 may be formed like the second thin-film transistor TFT2 illustrated in FIGS. 3A and 3B.

A gate-on voltage of a gate signal for turning the first transistor T1, the second transistor T2, and the fifth to eighth transistors T5 to T8 on may be a low-level voltage (a second level voltage), and a gate-off voltage of the gate signal for turning the same off may be a high-level voltage (a first level voltage). The gate-on voltage of the gate signal for turning the third transistor T3 and the fourth transistor T4 on may be the high-level voltage (the first level voltage) and the gate-off voltage of the gate signal for turning the same off may be the low-level voltage (the second level voltage).

The first transistor T1 may be connected between the driving voltage line VDL and the organic light-emitting diode OLED. The first transistor T1 may be connected to the driving voltage line VDL through the fifth transistor T5, and electrically connected to the organic light-emitting diode OLED through the sixth transistor T6. The first transistor T1 includes a gate connected to a first node N1, a first terminal connected to a second node N2, and a second terminal connected to a third node N3. The first transistor T1 may output a driving current corresponding to a data signal. The first transistor T1 may supply, to the organic light-emitting diode OLED, the driving current corresponding to a voltage applied to the second node N2, according to a switching operation of the second transistor T2.

The second transistor T2 may be connected between the data line DL and the second node N2. The second transistor T2 may include a gate connected to the first gate line GWL, a first terminal connected to the data line DL, and a second terminal connected to the second node N2. The second transistor T2 may transmit the data signal to the first transistor T1. The second transistor T2 may be turned on according to the first gate signal GW received through the first gate line GWL and transmit the data signal DATA to the second node N2 through the data line DL.

The third transistor T3 may be connected between the first node N1 and the third node N3. The third transistor T3 may be connected to the organic light-emitting diode OLED through the sixth transistor T6. The third transistor T3 may include a gate connected to the fifth gate line GCL, a first terminal connected to the third node N3, and a second terminal connected to the first node N1. The third transistor T3 may be turned on according to the fifth gate signal GC received through the fifth gate line GCL and the first transistor T1 may be diode-connected. When the first transistor T1 is diode-connected, a threshold voltage of the first transistor T1 may be compensated for.

The fourth transistor T4 may be connected between the first node N1 and the first initialization voltage line VIL1. The fourth transistor T4 may include a gate connected to the fourth gate line GIL, a first terminal connected to the first node N1, and a second terminal connected to the first initialization voltage line VIL1. The fourth transistor T4 may be turned on according to the fourth gate signal GI received through the fourth gate line GIL to transmit the first initialization voltage VINT to the first node N1, thereby initializing the first node N1, i.e., the gate of the first transistor T1.

The fifth transistor T5 may be connected between the driving voltage line VDL and the second node N2. The sixth transistor T6 may be connected between the third node N3 and the organic light-emitting diode OLED. The fifth transistor T5 may include a gate connected to the second gate line EML, a first terminal connected to the driving voltage line VDL, and a second terminal connected to the second node N2. The fifth transistor T5 may be transmit the first driving voltage ELVDD to the first transistor T1. The sixth transistor T6 may include a gate terminal connected to the second gate line EML, a first terminal connected to the third node N3, and a second terminal connected to a pixel electrode of the organic light-emitting diode OLED. The fifth transistor T5 and the sixth transistor T6 may be simultaneously turned on according to the second gate signal EM received through the second gate line EML, and thus a driving current flows through the organic light-emitting diode OLED.

The seventh transistor T7 may be connected between the organic light-emitting diode OLED and the second initialization voltage line VIL2. The seventh transistor T7 may include a gate connected to the third gate line GBL, a first terminal connected to the second terminal of the sixth transistor T6 and the pixel electrode of the organic light-emitting diode OLED, and a second terminal connected to the second initialization voltage line VIL2. The seventh transistor T7 may be turned on according to the third gate signal GB received through the third gate line GBL to initialize the pixel electrode of the organic light-emitting diode OLED by transmitting the second initialization voltage AINT to the pixel electrode of the organic light-emitting diode OLED.

The eighth transistor T8 may be connected between the second node N2 and the bias voltage line VBL, and supply a bias voltage Vbias to the first terminal of the first transistor T1. The eighth transistor T8 may include a gate connected to the third gate line GBL, a first terminal receiving the bias voltage Vbias, and a second terminal connected to the second node N2. The eighth transistor T8 may be turned on according to the third gate signal GB received through the third gate line GBL and compensate for a current characteristic change of the first transistor T1 by transmitting the bias voltage Vbias to the first terminal of the first transistor T1 and controlling the gate-source voltage of the first transistor T1.

The storage capacitor Cst may be connected between the driving voltage line VDL and the first node N1. The storage capacitor Cst may store a voltage corresponding to a voltage difference between the driving voltage line VDL and the first node N1. The storage capacitor Cst may store a threshold voltage of the first transistor T1 and the data signal DATA written through the second transistor T2.

The organic light-emitting diode OLED may include the pixel electrode (e.g. an anode) and an opposite electrode (e.g., a cathode) facing the pixel electrode, and the opposite electrode may receive the second driving voltage ELVSS. The organic light-emitting diode OLED may display an image by emitting light of a certain color by receiving a driving current corresponding to the data signal DATA from the first transistor T1.

Figure 6:
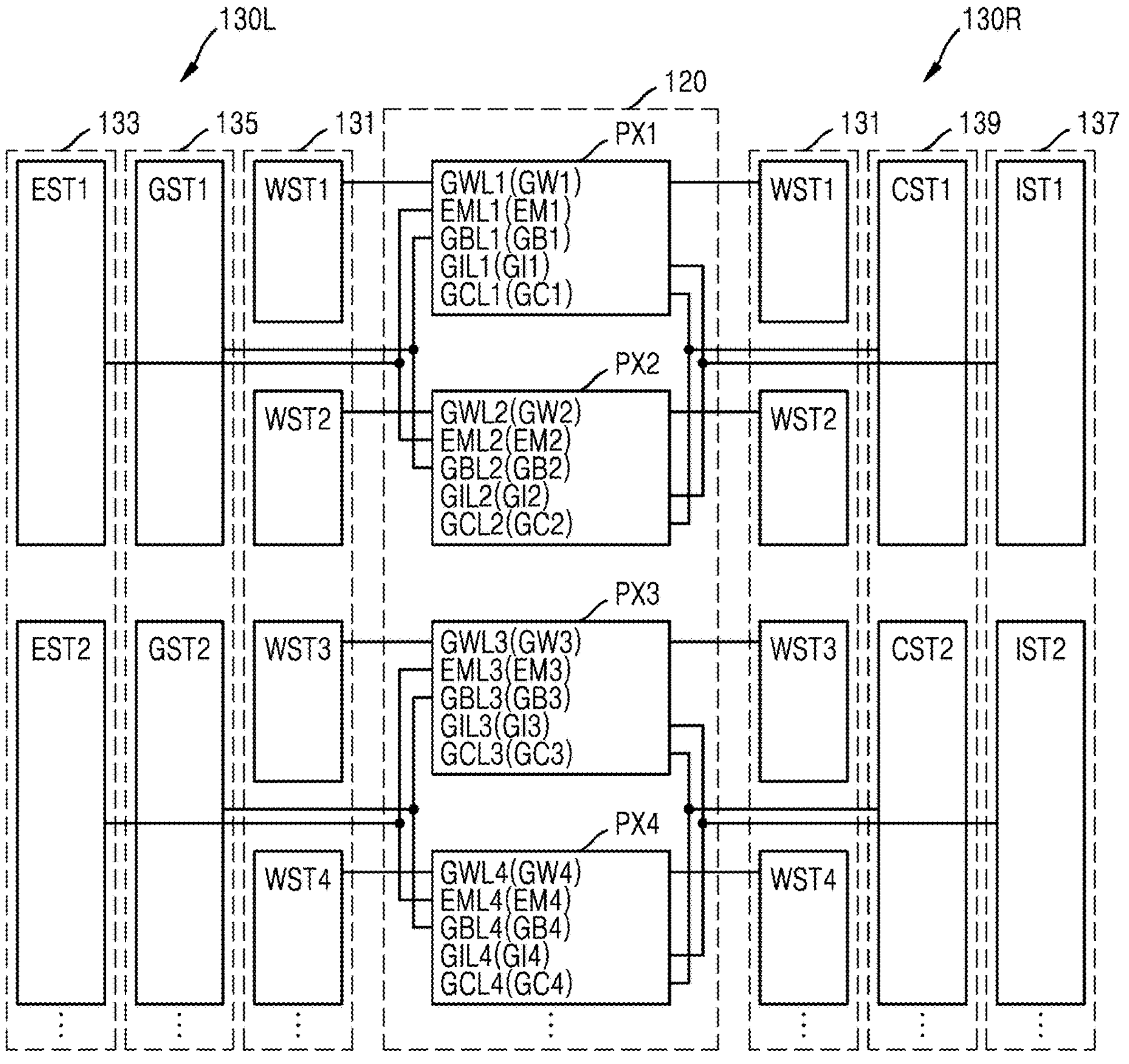
FIG. 6 is a diagram schematically showing some stages of a gate driving circuit.

FIG. 6 is a diagram schematically showing some stages of the gate driving circuit 130. The gate driving circuit 130 of FIG. 6 may be the gate driving circuit 130 of the display apparatus 1*b* shown in FIG. 4.

Referring to FIG. 6, the gate driving circuit 130 may include the first gate driving circuit unit 130L and the second gate driving circuit unit 130R. The first gate driving circuit unit 130L may include the first driving circuit 131, the second driving circuit 133, and the third driving circuit 135. The second gate driving circuit unit 130R may include the first driving circuit 131, the fourth driving circuit 137, and the fifth driving circuit 139.

The first driving circuit 131 may include a plurality of stages WST1, WST2, WST3, WST4, and so on, which are sequentially connected to each other, and the plurality of stages WST1, WST2, WST3, WST4, and so on may correspond to rows of the pixel region 120, respectively. Each of the plurality of stages WST1, WST2, WST3, WST4, and so on may generate the first gate signal GW and output the first gate signal GW to the first gate line GWL of a corresponding row. The first gate signals GW output by the plurality of stages WST1, WST2, WST3, WST4, and so on may be sequentially shifted. For example, the first gate signals GW may be sequentially output while being shifted at intervals of 1 horizontal period (H). Here, 1 H may be 1/(driving frequency×vertical resolution). The number of stages of the first driving circuit 131 may be the same as the number of rows or the number of first gate lines GWL.

The second driving circuit 133 may include a plurality of stages EST1, EST2, and so on, which are sequentially connected to each other, and the plurality of stages EST1, EST2, and so on may each correspond to two rows (a pair of rows) of the pixel region 120. Each of the plurality of stages EST1, EST2, and so on may be configured to generate the second gate signal EM and transmit the same to the second gate lines EML of the corresponding two rows. For example, the second gate signal EM may be simultaneously supplied to the two second gate lines EML arranged in the two rows, respectively. The second gate signals EM output by the plurality of stages EST1, EST2, and so on may be sequentially shifted. For example, the second gate signals EM may be sequentially output while being shifted at intervals of 2 H. The number of stages of the second driving circuit 133 may be ½ of the number of rows or ½ of the number of second gate lines EML.

The third driving circuit 135 may include a plurality of stages GST1, GST2, and so on, which are sequentially connected to each other, and the plurality of stages GST1, GST2, and so on may each correspond to two rows (a pair of rows) of the pixel region 120. Each of the plurality of stages GST1, GST2, and so on may be configured to generate the third gate signal GB and transmit the same to the third gate lines GBL of the corresponding two rows. For example, the third gate signal GB may be simultaneously supplied to the two third gate lines GBL arranged in the two rows, respectively. The third gate signals GB output by the plurality of stages GST1, GST2, and so on may be sequentially shifted. For example, the third gate signals GB may be sequentially output while being shifted at intervals of 2 H. The number of stages of the third driving circuit 135 may be ½ of the number of rows or ½ of the number of third gate lines GBL.

The fourth driving circuit 137 may include a plurality of stages IST1, IST2, and so on, which are sequentially connected to each other, and the plurality of stages IST1, IST2, and so on may each correspond to two rows (a pair of rows) of the pixel region 120. Each of the plurality of stages IST1, IST2, and so on may be configured to generate the fourth gate signal GI and transmit the same to the fourth gate lines GIL of the corresponding two rows. For example, the fourth gate signal GI may be simultaneously supplied to the two fourth gate lines GIL arranged in the two rows, respectively. The fourth gate signals GI output by the plurality of stages IST1, IST2, and so on may be sequentially shifted. For example, the fourth gate signals GI may be sequentially output while being shifted at intervals of 2 H. The number of stages of the fourth driving circuit 137 may be ½ of the number of rows or ½ of the number of fourth gate lines GIL.

The fifth driving circuit 139 may include a plurality of stages CST1, CST2, and so on, which are sequentially connected to each other, and the plurality of stages CST1, CST2, and so on may each correspond to two rows (a pair of rows) of the pixel region 120. Each of the plurality of stages CST1, CST2, and so on may be configured to generate the fifth gate signal GC and transmit the same to the fifth gate lines GCL of the corresponding two rows. For example, the fifth gate signal GC may be simultaneously supplied to the two fifth gate lines GCL arranged in the two rows, respectively. The fifth gate signals GC output by the plurality of stages CST1, CST2, and so on may be sequentially shifted. For example, the fifth gate signals GC may be sequentially output while being shifted at intervals of 2 H. The number of stages of the fifth driving circuit 139 may be ½ of the number of rows or ½ of the number of fifth gate lines GCL. While FIG. 6 illustrates an embodiment in which each stage of the second to fifth driving circuits 133 to 139 is connected to two rows of pixels of the pixel region 120. However, an embodiment is not limited thereto. In another embodiment, each stage of the second to fifth driving circuits 133 to 139 may be connected to three or more rows of pixels of the pixel region 120. In this case, the number of stages of each of the second to fifth driving circuits 133 to 139 and the interval of shifted output of the corresponding gate signal may be changed, accordingly.

A first stage WST1 of the first driving circuit 131 may be configured to output a first-first gate signal GW1 to a first gate line GWL1 connected to a first pixel PX1 arranged in a first row, and a second stage WST2 may be configured to output a second-first gate signal GW2 to a first gate line GWL2 connected to a second pixel PX2 arranged in a second row.

The second gate signal EM output by a first stage EST1 of the second driving circuit 133 may be simultaneously supplied as a first-second gate signal EM1 to a second gate line EML1 connected to the first pixel PX1, and as a second-second gate signal EM2 to a second gate line EML2 connected to the second pixel PX2. The second gate signal EM output by a second stage EST2 of the second driving circuit 133 may be simultaneously supplied as a third-second gate signal EM3 to a second gate line EML3 to a third pixel PX3 arranged in a third row, and as a fourth-second gate signal EM4 to a second gate line EML4 connected to a fourth pixel PX4 arranged in a fourth row.

The third gate signal GB output by a first stage GST1 of the third driving circuit 135 may be simultaneously supplied as a first-third gate signal GB1 to a third gate line GBL1 connected to the first pixel PX1, and as a second-third gate signal GB2 to a third gate line GBL2 connected to the second pixel PX2. The third gate signal GB output by a second stage GST2 of the third driving circuit 135 may be simultaneously supplied as a third-third gate signal GB3 to a third gate line GBL3 connected to the third pixel PX3, and as a fourth-third gate signal GB4 to a third gate line GBL4 connected to the fourth pixel PX4.

The fourth gate signal GI output by a first stage IST1 of the fourth driving circuit 137 may be simultaneously supplied as a first-fourth gate signal G11 to a fourth gate line GIL1 connected to the first pixel PX1, and as a second-fourth gate signal G12 to a fourth gate line GIL2 connected to the second pixel PX2. The fourth gate signal GI output by a second stage IST2 of the fourth driving circuit 137 may be simultaneously supplied as a third-fourth gate signal G13 to a fourth gate line GIL3 connected to the third pixel PX3, and as a fourth-fourth gate signal G14 to a fourth gate line GIL4 connected to the fourth pixel PX4.

The fifth gate signal GC output by a first stage CST1 of the fifth driving circuit 139 may be simultaneously supplied as a first-fifth gate signal GC1 to a fifth gate line GCL1 connected to the first pixel PX1, and as a second-fifth gate signal GC2 to a fifth gate line GCL2 connected to the second pixel PX2. The fifth gate signal GC output by a second stage CST2 of the fifth driving circuit 139 may be simultaneously supplied as a third-fifth gate signal GC3 to a fifth gate line GCL3 connected to the third pixel PX3, and as a fourth-fifth gate signal GC4 to a fifth gate line GCL4 connected to the fourth pixel PX4.

Figure 7A:
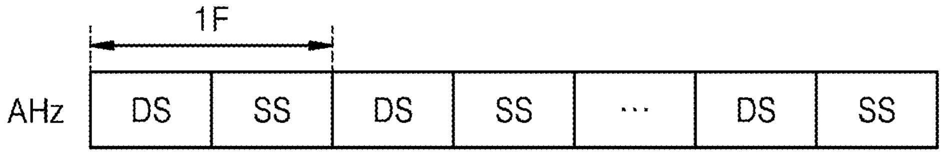
FIGS. 7A and 7B are conceptual diagrams for describing a method of driving a display apparatus according to a driving frequency.
Figure 7B:
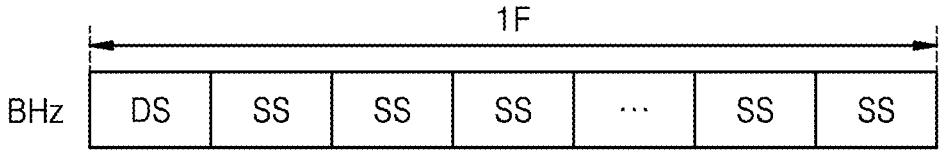
Figure 8:
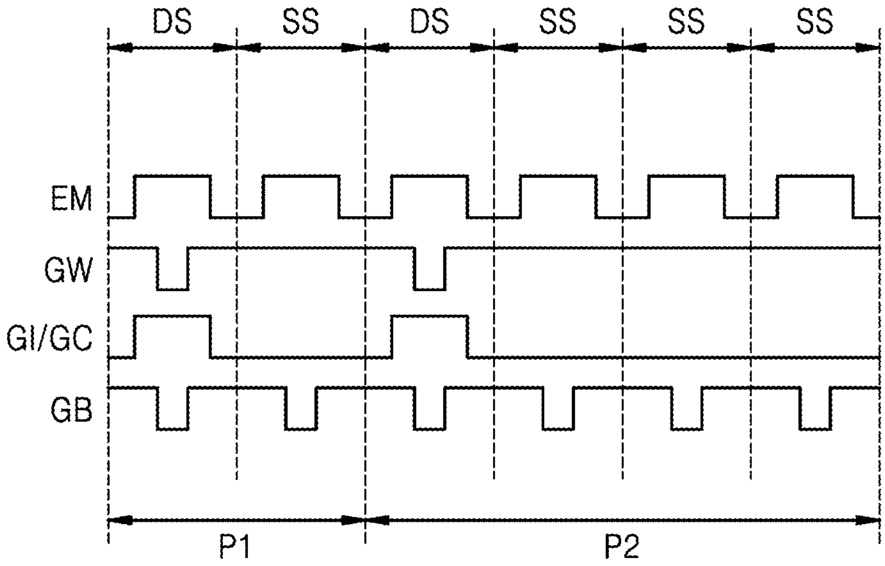
FIG. 8 is a diagram showing signals supplied to a pixel during a first scan period and a second scan period.

FIGS. 7A and 7B are conceptual diagrams for describing a method of driving a display apparatus according to a driving frequency. FIG. 8 is a diagram showing signals supplied to a pixel during a first scan period and a second scan period.

Referring to FIGS. 7A and 7B, the display apparatus 1 or 1*b* according to an embodiment may support a variable refresh rate ("VRR"). A refresh rate is a frequency of a data signal being substantially written on a driving transistor of the pixel PX, may also be referred to as a screen scan rate or a screen playback rate, and may indicate the number of image frames reproduced per second. According to an embodiment, the refresh rate may be an output frequency of the gate driving circuit 130 of FIG. 3 and/or the data driving circuit 150 of FIG. 3. A frequency corresponding to the refresh rate may be a driving frequency. The display apparatus 1 or 1*b* may adjust an output frequency of a plurality of gate driving circuits and a corresponding output frequency of a data driving circuit, according to the driving frequency.

The display apparatus 1 or 1*b* supporting VRR may operate by changing the driving frequency within a range of a maximum driving frequency and a minimum driving frequency. For example, when the refresh rate is about 60 Hz, a gate signal for writing a data signal may be supplied to each horizontal line (row) from the gate driving circuit 130 of FIG. 3, 60 times per second. The display apparatus 1 or 1*b* may display an image by changing the driving frequency according to the refresh rate.

One frame 1F may include a first scan period DS or may include the first scan period DS and at least one second scan period SS, according to the driving frequency. For example, as shown in FIG. 7A, one frame 1F may include one first scan period DS and one second scan period SS in the display apparatus 1 or 1*b* operating at a driving frequency of A Hz. As shown in FIG. 7B, one frame 1F may include one first scan period DS and two or more second scan periods SS in the display apparatus 1 or 1*b* operating at a driving frequency of B Hz, which is lower than the driving frequency of A Hz. A length of one frame 1F may increase when the driving frequency decreases. According to an embodiment, A Hz of FIG. 7A may be a driving frequency of 120 Hz, and B Hz of FIG. 7B may be a driving frequency lower than 120 Hz, such as 10 Hz or the like.

The first scan period DS may be defined as an "address scan period" during which a new data signal is written on the pixel PX and the pixel PX emits light with luminance corresponding to the written new data signal. An operation in which a data signal is written on the pixel PX from the data line DL may also be referred to as a data programming operation. The second scan period SS may be defined as a "self-scan period" during which a data signal is not written on the pixel PX. During the second scan period SS, the data signal pre-written during the first scan period AS is maintained and the pixel PX may emit light with luminance corresponding to the data signal written during the first scan period DS and maintained. A length of the second scan period SS may be less than or equal to a length of the first scan period DS.

During the first scan period DS and the second scan period SS, the gate driving circuit 130 may supply the first to fifth gate signals GW, EM, GB, GI, and GC to the first to fifth gate lines GWL, EML, GBL, GIL, and GCL, respectively. Start timings and end timings of a gate-on voltage holding period and a gate-off voltage holding period of the first to fifth gate signals GW, EM, GB, GI, and GC may be the same as or different from each other, and some signals may overlap during a partial period.

During the first scan period DS and the second scan period SS, the power supply circuit 170 may supply the first driving voltage ELVDD to the driving voltage line VDL, the bias voltage Vbias to the bias voltage line VBL, the first initialization voltage VINT to the first initialization voltage line VIL1, and the second initialization voltage AINT to the second initialization voltage line VIL2.

According to an embodiment, during one frame, the gate driving circuit 130 may supply the first to fifth gate signals GW, EM, GB, GI, and GC of one cycle to the first to fifth gate lines GWL, EML, GBL, GIL, and GCL, respectively. One cycle denotes a minimum unit signal pattern in a repeated signal waveform and a time during which one cycle is performed may be one period. For example, in FIGS. 7A and 7B, during the first scan period DS of one time and the second scan period SS of one or more times, the gate driving circuit 130 may supply the first to fifth gate signals GW, EM, GB, GI, and GC of one cycle to the first to fifth gate lines GWL, EML, GBL, GIL, and GCL, respectively.

According to an embodiment, during one frame, the gate driving circuit 130 may supply the first to fifth gate signals GW, EM, GB, GI, and GC of one or more cycles to the first to fifth gate lines GWL, EML, GBL, GIL, and GCL, respectively. For example, in FIGS. 7A and 7B, during the first scan period DS of one time and the second scan period SS of one or more times, the first gate signal GW of one cycle may be supplied to the first gate line GWL, the fourth gate signal GI of one cycle may be supplied to the fourth gate line GIL, the fifth gate signal GC of one cycle may be supplied to the fifth gate line GCL, the second gate signal EM of two or more cycles may be supplied to the second gate line EML, and the third gate signal GB of two or more cycles may be supplied to the third gate line GBL.

FIG. 8 is a diagram schematically illustrating gate signals to describe cycles of the gate signals, and does not illustrate a timing of a gate-on voltage of the gate signals. For example, in FIG. 8, during the first scan period DS, a timing at which the first gate signal GW of a gate-on voltage is supplied to a pixel may precede a timing at which the third gate signal GB of a gate-on voltage is supplied to the pixel. During the first scan period DS, a timing at which the fourth gate signal GI of a gate-on voltage is supplied to the pixel and a timing at which the fifth gate signal GC of a gate-on voltage is supplied to the pixel may be different from each other. During the first scan period DS, the timing at which the fourth gate signal GI of the gate-on voltage is supplied to the pixel and the timing at which the fifth gate signal GC of the gate-on voltage is supplied to the pixel may precede the timing at which the first gate signal GW of the gate-on voltage is supplied to the pixel.

Referring to FIG. 8, during one frame of a first period P1, the gate driving circuit 130 may supply the first gate signal GW of one cycle to the first gate line GWL, the fourth gate signal GI of one cycle to the fourth gate line GIL, the fifth gate signal GC of one cycle to the fifth gate line GCL, the second gate signal EM of two cycles to the second gate line EML, and the third gate signal GB of two cycles to the third gate line GBL. During one frame of a second period P2, the gate driving circuit 130 may supply the first gate signal GW of one cycle to the first gate line GWL, the fourth gate signal GI of one cycle to the fourth gate line GIL, the fifth gate signal GC of one cycle to the fifth gate line GCL, the second gate signal EM of four cycles to the second gate line EML, and the third gate signal GB of four cycles to the third gate line GBL.

The display apparatus 1 or 1*b* may display an image by changing the driving frequency according to a VRR. For example, one frame 1F may include one first scan period DS and one second scan period SS during the first period P1, and one frame 1F may include one first scan period DS and three second scan periods SS during the second period P2. However, an embodiment is not limited thereto, and in the display apparatus 1 or 1*b*, one frame 1F may include one first scan period DS or may include one first scan period DS and two or more second scan periods SS in another embodiment. The first period P1 may be an example in which a display apparatus operates at a driving frequency of 120 Hz and the second period P2 may be an example in which a display apparatus operates at a driving frequency of 60 Hz.

In one frame, a period during which the second gate signal EM is a gate-off voltage may be a non-emission period, and a period during which the second gate signal EM is a gate-on voltage may be an emission period. A period during which the first gate signal GW is a gate-on voltage may be a period during which a data signal is written on a pixel. A period during which the fourth gate signal GI is a gate-on voltage may be period during which a gate voltage of a driving transistor is initialized by transmitting the first initialization voltage VINT to a gate of the driving transistor (e.g., the first transistor T1). A period during which the fifth gate signal GC is a gate-on voltage may be a period during which the driving transistor is diode-connected to compensate for a threshold voltage of the driving transistor. A period during which the third gate signal GB is a gate-on voltage may be a period during which a voltage of a pixel electrode of the organic light-emitting diode OLED is initialized by transmitting the second initialization voltage AINT to the pixel electrode and a voltage-current characteristic of the driving transistor is compensated for by supplying a bias voltage to one terminal of the driving transistor.

The second gate signal EM of a gate-off voltage (a first level voltage) may be supplied to the second gate line EML during a partial period of the first scan period DS. The non-emission period during which the second gate signal EM of the gate-off voltage (the first level voltage) is supplied may include a period during which the first gate signal GW of the gate-on voltage (a second level voltage) is supplied to the first gate line GWL, a period during which the third gate signal GB of the gate-on voltage (the second level voltage) is supplied to the third gate line GBL, a period during which the fourth gate signal GI of the gate-on voltage (the first level voltage) is supplied to the fourth gate line GIL, and a period during which the fifth gate signal GC of the gate-on voltage (the first level voltage) is supplied to the fifth gate line GCL.

The second transistor T2 is turned on by the first gate signal GW. The turned-on second transistor T2 may transmit the data signal Vdata supplied from the data line DL to the second node N2. Accordingly, the data signal DATA may be supplied to the first terminal of the first transistor T1.

The seventh transistor T7 and the eighth transistor T8 may be turned on by the third gate signal GB. The pixel electrode of the organic light-emitting diode OLED may be initialized to the second initialization voltage AINT by the turned-on seventh transistor T7, and the bias voltage Vbias may be supplied to the second node N2 by the turned-on eighth transistor T8.

The fourth transistor T4 may be turned on by the fourth gate signal GI. The gate of the first transistor T1 may be initialized to the first initialization voltage VINT by the turned-on fourth transistor T4.

The third transistor T3 may be turned on by the fifth gate signal GC. The bias voltage Vbias may be supplied to the gate of the first transistor T1 in a diode-connected state, by the turned-on third transistor T3.

A data signal and a voltage corresponding to a threshold voltage of the first transistor T1 may be charged in the storage capacitor Cst.

The second gate signal EM of a gate-on voltage (the second level voltage) may be supplied to the second gate line EML during another partial period of the first scan period DS. In the emission period during which the second gate signal EM of the gate-on voltage (the second level voltage) is supplied, the first gate signal GW and third gate signal GB of the gate-off voltage (the first level voltage) may be supplied to the first gate line GWL and the third gate line GBL, respectively, and the fourth gate signal GI and fifth gate signal GC of the gate-off voltage (the second level voltage) may be supplied to the fourth gate line GIL and the fifth gate line GCL, respectively.

The fifth transistor T5 and the sixth transistor T6 may be turned on by the second gate signal EM. A current path from the driving voltage line VDL to the organic light-emitting diode OLED may be formed by the turned-on fifth transistor T5 and sixth transistor T6. The first transistor T1 may output a driving current corresponding to a data voltage stored in the storage capacitor Cst, and the organic light-emitting diode OLED may emit light with luminance corresponding to the driving current irrelevant to the threshold voltage of the first transistor T1.

The second gate signal EM of the gate-off voltage (the first level voltage) may be supplied to the second gate line EML during a partial period of the second scan period SS. In the partial period of the non-emission period during which the second gate signal EM of the gate-off voltage (the first level voltage) is supplied, the third gate signal GB of the gate-on voltage (the second level voltage) may be supplied to the third gate line GBL. The seventh transistor T7 and the eighth transistor T8 may be turned on by the third gate signal GB. The pixel electrode of the organic light-emitting diode OLED may be initialized to the second initialization voltage AINT by the turned-on seventh transistor T7, and the gate-source voltage of the first transistor T1 may be controlled as the bias voltage Vbias is supplied to the first terminal of the first transistor T1 by the turned-on eighth transistor T8, and thus, a change in the voltage-current characteristic of the first transistor T1, which is generated by stress applied to the first transistor T1 during the first scan period DS, may be compensated for. Accordingly, during the second scan period SS, the pixel PX may maintain luminance of an image output during the first scan period DS.

The second gate signal EM of the gate-on voltage (the second level voltage) may be supplied to the second gate line EML during another partial period of the second scan period SS. During the second scan period SS, the first gate signal GW of the gate-off voltage (the first level voltage) may be supplied to the first gate line GWL, and the fourth gate signal GI and fifth gate signal GC of the gate-off voltage (the second level voltage) may be supplied to the fourth gate line GIL and fifth gate line GCL, respectively.

Here, when a signal is supplied (applied), a gate-on voltage of the signal may be supplied. When a signal is not supplied (applied), a gate-off voltage of the signal may be supplied.

Figure 9:
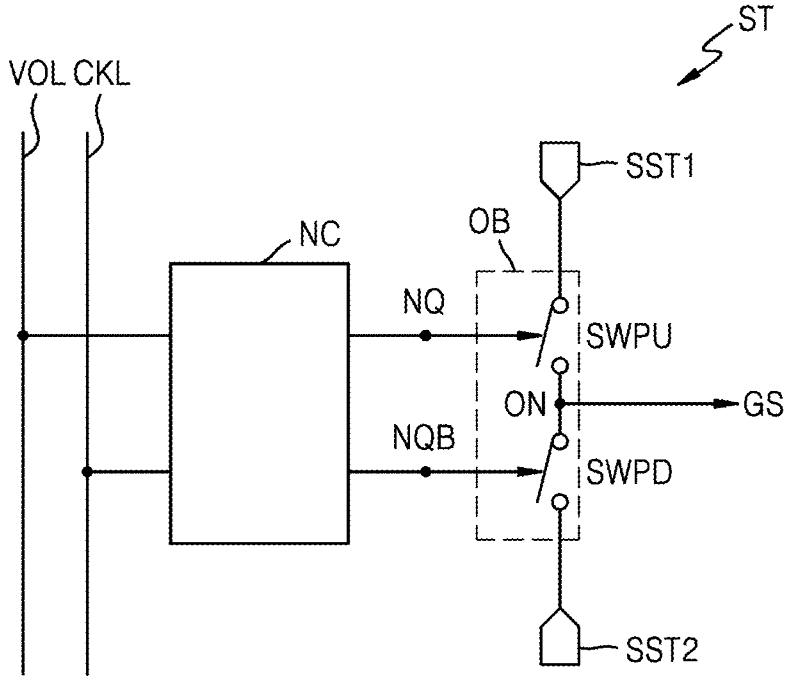
FIG. 9 is a diagram schematically showing any stage configuring a gate driving circuit, according to an embodiment.

FIG. 9 is a diagram schematically showing any stage configuring a gate driving circuit, according to an embodiment.

The gate driving circuit 130 of FIG. 4 may include a plurality of stages ST, and each stage ST may receive at least one clock signal and at least one voltage signal, and generate at least one gate signal GS. The stage ST may receive the at least one clock signal from at least one clock line CKL, and receive the at least one voltage signal from at least one voltage line VOL.

As shown in FIG. 6, the first driving circuit 131, the second driving circuit 133, the third driving circuit 135, the fourth driving circuit 137, and the fifth driving circuit 139 of the gate driving circuit 130 of FIG. 4 may each include the plurality of stages ST.

Hereinafter, for convenience of description, each stage ST of the first driving circuit 131 will be referred to as a first stage WST, each stage ST of the second driving circuit 133 will be referred to as a second stage EST, each stage ST of the third driving circuit 135 will be referred to as a third stage GST, each stage ST of the fourth driving circuit 137 will be referred to as a fourth stage IST, and each stage ST of the fifth driving circuit 139 will be referred to as a fifth stage CST.

The first stage WST of the first driving circuit 131 may output the first gate signal GW through the first gate line GWL. The second stage EST of the second driving circuit 133 may output the second gate signal EM through the second gate line EML. The third stage GST of the third driving circuit 135 may output the third gate signal GB through the third gate line GBL. The fourth stage IST of the fourth driving circuit 137 may output the fourth gate signal GI through the fourth gate line GIL. The fifth stage CST of the fifth driving circuit 139 may output the fifth gate signal GC through the fifth gate line GCL.

The stage ST may include a node control circuit NC configured to control voltage levels of a first control node NQ and a second control node NQB, and an output circuit OB including a pull-up transistor SWPU and a pull-down transistor SWPD.

The pull-up transistor SWPU may be turned on or off according to the voltage level of the first control node NQ, and connected between a terminal SST1 and an output node ON to output a signal of a first voltage level applied to the terminal SST1 as the gate signal GS. The pull-down transistor SWPD may be turned on or off according to the voltage level of the second control node NQB and connected between a terminal SST2 and the output node ON to output a signal of a second voltage level applied to the terminal SST2 as the gate signal GS. According to an embodiment, the first voltage level may be a high voltage level and the second voltage level may be a low voltage level.

Configurations of the node control circuits NC included in the stages ST of the first driving circuit 131, second driving circuit 133, third driving circuit 135, fourth driving circuit 137, and fifth driving circuit 139 may be different from each other. According to an embodiment, some of the first driving circuit 131, second driving circuit 133, third driving circuit 135, fourth driving circuit 137, and fifth driving circuit 139 may share at least one clock line. In driving circuits sharing a clock line, structures of transistors connected to the shared clock line may be symmetrical.

According to an embodiment, driving circuits sharing a clock line may be driving circuits configured to output a gate signal during the first scan period DS and the second scan period SS as described above with reference to FIG. 8. For example, the second driving circuit 133 and the third driving circuit 135 may be adjacently arranged on one of a left side and a right side of the display area DA, and the second driving circuit 133 and the third driving circuit 135 may share a clock line. When different driving circuits share a clock line, the number of clock lines may be reduced, and thus, the area of peripheral area may be reduced and power consumption may be reduced.

The fourth driving circuit 137 and fifth driving circuit 139, which output a gate signal only during the first scan period DS, may be arranged on one of the left side and the right side of the display area DA. According to an embodiment, the fourth driving circuit 137 and fifth driving circuit 139, which include the same number of stages, may share a clock line.

Figure 10A:
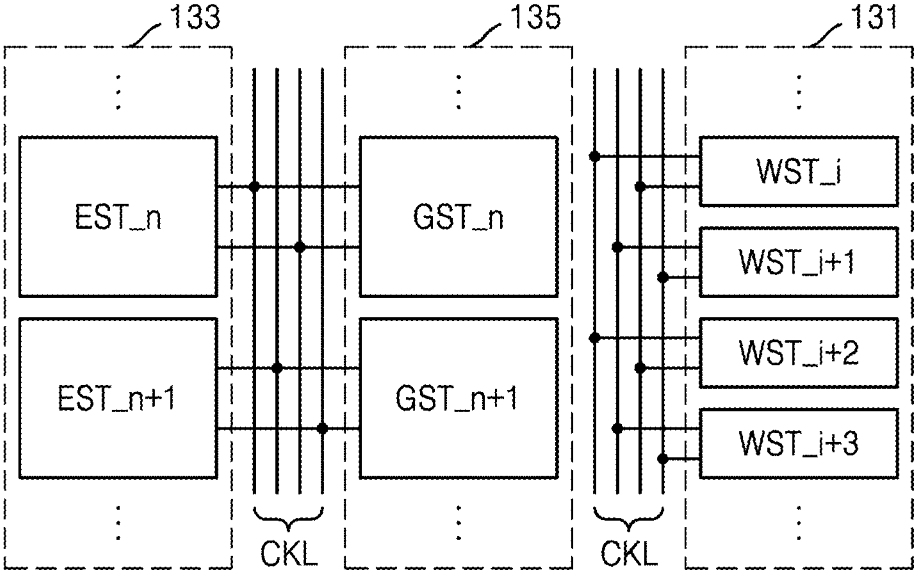
FIGS. 10A and 10B are diagrams schematically showing a portion of a gate driving circuit of FIG. 3.
Figure 10B:
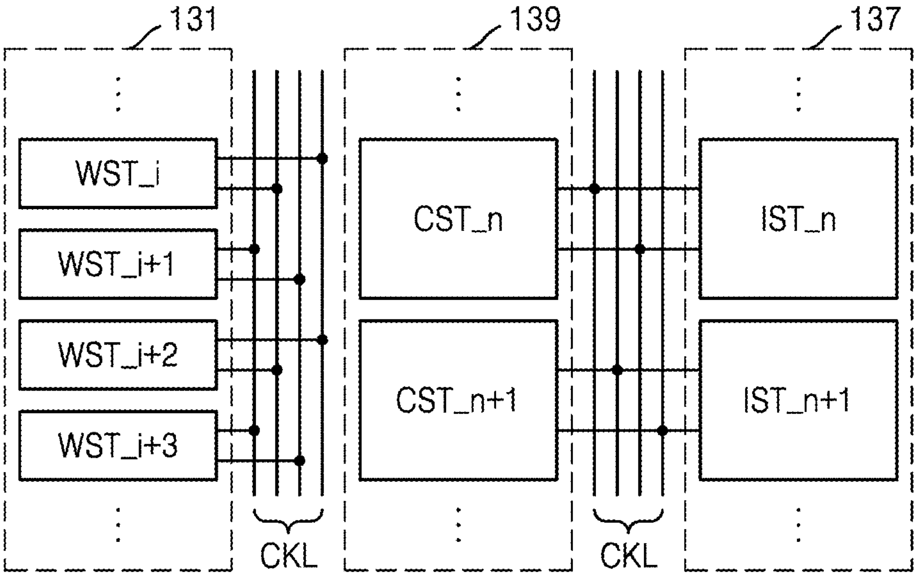

FIGS. 10A and 10B are diagrams schematically showing a portion of the gate driving circuit 130 of FIG. 3.

FIG. 10A schematically illustrates (i)th to (i+3)th first stages WST_i, WST_i+1, WST_i+2, and WST_i+3 of the first driving circuit 131, (n)th and (n+1)th second stages EST_n and EST_n+1 of the second driving circuit 133, and (n)th and (n+1)th third stages GST_n and GST_n+1 of the third driving circuit 135, which are arranged on the left side of the pixel region 120.

FIG. 10B schematically illustrates the (i)th to (i+3)th first stages WST_i, WST_i+1, WST_i+2, and WST_i+3 of the first driving circuit 131, (n)th and (n+1)th fourth stages IST_n, IST_n+1 of the fourth driving circuit 137, and (n)th and (n+1)th fifth stages CST_n and CST_n+1 of the fifth driving circuit 139, which are arranged on the right side of the pixel region 120.

As shown in FIG. 10A, the first driving circuit 131, the second driving circuit 133, and the third driving circuit 135 may receive clock signals from respective clock lines CKL.

The clock lines CKL may be arranged on one side of the first driving circuit 131 and the clock lines CKL may be connected to first stages . . . , WST_i, WST_i+1, WST_i+2, WST_i+3, . . . of the first driving circuit 131. The clock lines CKL connected to the first driving circuit 131 may include clock lines connected to odd first stages (e.g., the (i)th first stage WST_i and the (i+2)th first stage WST_i+2) from among the plurality of first stages WST included in the first driving circuit 131, and clock lines connected to even first stages (e.g., the (i+1)th first stage WST_i+1 and the (i+3)th first stage WST_i+3). According to an embodiment, the clock lines CKL connected to the first driving circuit 131 may be provided between the first driving circuit 131 and the third driving circuit 135. The clock lines CKL connected to the first driving circuit 131 may be extend in a y-axis direction and spaced apart from each other in an x-axis direction.

The second driving circuit 133 and the third driving circuit 135 may include the same number of stages and share the clock lines CKL. The clock lines CKL may be provided between the second driving circuit 133 and the third driving circuit 135, and the clock lines CKL may be connected to second stages . . . , EST_n, EST_n+1, . . . of the second driving circuit 133 and third stages . . . , GST_n, GST_n+1, . . . of the third driving circuit 135. The clock lines CKL connected to the second driving circuit 133 and the third driving circuit 135 may include first clock lines and second clock lines. Each of the first clock lines and the second clock lines may extend in the y-axis direction and spaced apart from each other in the x-axis direction.

The first clock lines may be connected to odd second stages (e.g., the (n)th second stage EST_n) from among the plurality of second stages EST included in the second driving circuit 133, and to odd third stages (e.g., the (n)th third stage GST_n) from among the plurality of third stages GST included in the third driving circuit 135.

The second clock lines may be connected to even second stages (e.g., the (n+1)th second stage EST_n+1) from among the plurality of second stages EST included in the second driving circuit 133 and even third stages (e.g., the (n)th third stage GST_n+1) from among the plurality of third stages GST.

As shown in FIG. 10B, the first driving circuit 131, the fourth driving circuit 137, and the fifth driving circuit 139 may receive clock signals from respective clock lines CKL.

The first driving circuit 131 has been described with reference to FIG. 10A, and thus, detailed description thereof is not provided again. According to an embodiment, the clock lines CKL connected to the first driving circuit 131 may be provided between the first driving circuit 131 and the fifth driving circuit 139.

The fourth driving circuit 137 and the fifth driving circuit 139 may share the clock lines CKL. The clock lines CKL may be provided between the fourth driving circuit 137 and the fifth driving circuit 139, and the clock lines CKL may be connected to fourth stages . . . , IST_n, IST_n+1, . . . of the fourth driving circuit 137 and fifth stages . . . , CST_n, CST_n+1, . . . of the fifth driving circuit 139. The clock lines CKL connected to the fourth driving circuit 137 and the fifth driving circuit 139 may include third clock lines and fourth clock lines. Each of the third clock lines and the fourth clock lines may extend in the y-axis direction and spaced apart from each other in the x-axis direction.

The third clock lines may be connected to odd fourth stages (e.g., the (n)th fourth stage IST_n) from among the plurality of fourth stages IST included in the fourth driving circuit 137, and to odd fifth stages (e.g., the (n)th fifth stage CST_n) from among the plurality of fifth stages CST included in the fifth driving circuit 139.

The fourth clock lines may be connected to even fourth stages (e.g., the (n+1)th fourth stage IST_n+1) from among the plurality of fourth stages IST included in the fourth driving circuit 137 and even fifth stages (e.g., the (n)th fifth stage CST_n+1) from among the plurality of fifth stages CST.

The plurality of second stages EST and the plurality of third stages GST may share the clock lines CKL provided between the second driving circuit 133 and the third driving circuit 135, and the clock signals may be supplied to the plurality of second stages EST and the plurality of third stages GST through the clock lines CKL connected to the second driving circuit 133 and the third driving circuit 135.

The plurality of fourth stages IST and the plurality of fifth stages CST may share the clock lines CKL provided between the fourth driving circuit 137 and the fifth driving circuit 139, and the clock signals may be supplied to the plurality of fourth stages IST and the plurality of fifth stages CST through the clock lines CKL connected to the fourth driving circuit 137 and the fifth driving circuit 139.

Hereinafter, an embodiment will be described based on clock lines provided between the second driving circuit 133 and the third driving circuit 135, and an embodiment related to the clock lines provided between the second driving circuit 133 and the third driving circuit 135 will also be applied to clock lines provided between the fourth driving circuit 137 and the fifth driving circuit 139.

FIGS. 11, 12, 13, and 14 are each a diagram schematically showing any stage configuring a gate driving circuit, according to an embodiment.

The second driving circuit 133 of FIG. 4 may include the plurality of second stages EST and the third driving circuit 135 of FIG. 4 may include the plurality of third stages GST. Each of the second stages EST and third stages GST may receive at least one clock signal from first clock lines CKLP1 and/or second clock lines CKLP2, and generate at least one gate signal GS. The first clock lines CKLP1 may include a first-1 clock line CKL1 and a first-2 clock line CKL3, and the second clock lines CKLP2 may include a second-1 clock line CKL2 and a second-2 clock line CKL4. Each of the first clock lines CKLP1 and second clock lines CKLP2 may extend in the y-axis direction (the second direction).

A first clock signal supplied by the first-1 clock line CKL1, a second clock signal supplied by the second-1 clock line CKL2, a third clock signal supplied by the first-2 clock line CKL3, and a fourth clock signal supplied by the second-2 clock line CKL4 may be signals in which phases are sequentially shifted at certain intervals. Odd second stages EST_o and odd third stages GST_o may receive the first clock signal and the third clock signal through the first-1 clock line CKL1 and the first-2 clock line CKL3. Even second stages EST_e and even third stages GST_e may receive the second clock signal and the fourth clock signal through the second-1 clock line CKL2 and the second-2 clock line CKL4.

The plurality of second stages EST may include the odd second stages EST_o and the even second stages EST_e, and the plurality of third stages GST may include the odd third stages GST_o and the even third stages GST_e. The odd second stages EST_o may include at least one of transistors TR1 and TR2 that are connected to the first clock lines CKLP1 and receive a clock signal. The odd third stages GST_o may include at least one of transistors TR3 and TR4 that are connected to the first clock lines CKLP1 and receive a clock signal. The even second stages EST_e may include at least one of the transistors TR1 and TR2 that are connected to the second clock lines CKLP2 and receive a clock signal. The even third stages GST_e may include at least one of the transistors TR3 and TR4 that are connected to the second clock lines CKLP2 and receive a clock signal. The transistors TR1, TR2, TR3, and TR4 included in each stage illustrated in FIGS. 11 to 14 are for schematically showing locations where the transistors TR1, TR2, TR3, and TR4 are arranged, and sizes thereof are not limited.

Only transistors connected to a clock line are illustrated in FIGS. 11 to 14 for convenience of description and illustration, and the second stages EST and the third stages GST may further include at least one transistor and at least one capacitor according to a configuration of a stage.

According to an embodiment, the odd second stages EST_o and the odd third stages GST_o may share the first clock lines CKLP1 and receive the first clock signal and the third clock signal from the shared first clock lines CKLP1. The even second stages EST_e and the even third stages GST_e may share the second clock lines CKLP2 and receive the second clock signal and the fourth clock signal from the shared second clock lines CKLP2.

Figure 11:
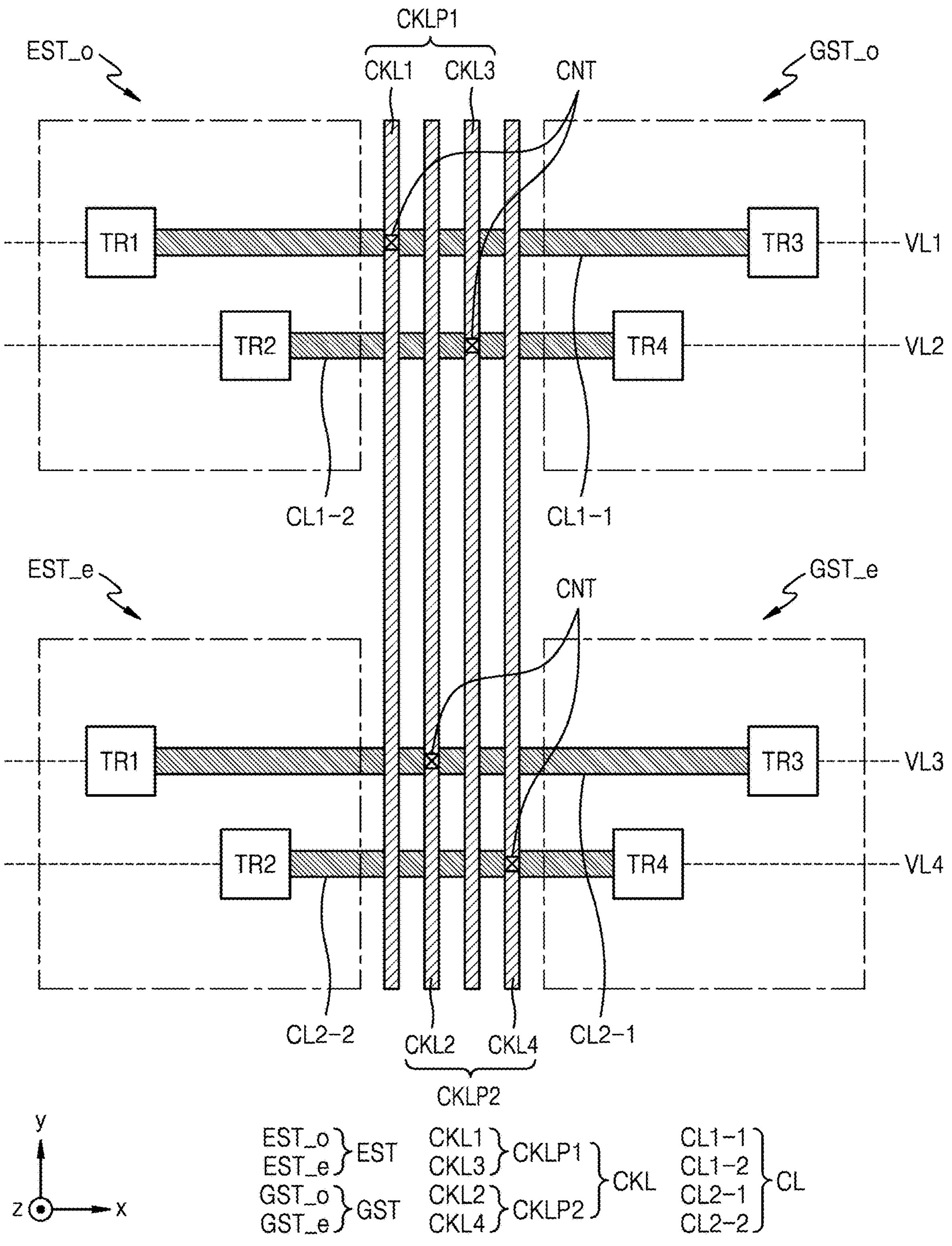
FIGS. 11, 12, 13, and 14 are each a diagram schematically showing any stage configuring a gate driving circuit, according to an embodiment.

Referring to FIG. 11, the first clock lines CKLP1 and/or the second clock lines CKLP2 may be arranged between the odd second stage EST_o and the odd third stage GST_o and between the even second stage EST_e and the even third stage GST_e. The first clock lines CKLP1 and/or the second clock lines CKLP2 may not overlap the second stages EST and the third stages GST.

According to another embodiment, the odd second stages EST_o and the odd third stages GST_o may share the second clock lines CKLP2, and the even second stages EST_e and the even third stages GST_e may share the first clock lines CKLP1. FIG. 11 is only an example and may illustrate that the odd second stages EST_o and the odd third stages GST_o share the first clock lines CKLP1 and the even second stages EST_e and the even third stages GST_e share the second clock lines CKLP2 to receive clock signals.

Among the first clock lines CKLP1, the first-1 clock line CKL1 may be connected to the odd second stage EST_o and the odd third stage GST_o by a first-1 connection line CL1-1. For example, the first-1 clock line CKL1 and the first-1 connection line CL1-1 may be arranged on different layers, and the first-1 clock line CKL1 may be connected to the first-1 connection line CL1-1 by contacting the same through a contact hole CNT. The first-1 connection line CL1-1 may be connected to the transistor TR1 included in the odd second stage EST_o and the transistor TR3 included in the odd third stage GST_o, and apply the first clock signal to the connected transistors TR1 and TR3.

Among the first clock lines CKLP1, the first-2 clock line CKL3 may be connected to the odd second stage EST_o and the odd third stage GST_o by a first-2 connection line CL1-2. For example, the first-2 clock line CKL3 and the first-2 connection line CL1-2 may be arranged on different layers, and the first-2 clock line CKL3 may be connected to the first-2 connection line CL1-2 by contacting the same through the contact hole CNT. The first-2 connection line CL1-2 may be connected to the transistor TR2 included in the odd second stage EST_o and the transistor TR4 included in the odd third stage GST_o, and apply the third clock signal to the connected transistors TR2 and TR4.

Among the second clock lines CKLP2, the second-1 clock line CKL2 may be connected to the even second stage EST_e and the even third stage GST_e by a second-1 connection line CL2-1. For example, the second-1 clock line CKL2 and the second-1 connection line CL2-1 may be arranged on different layers, and the second-1 clock line CKL2 may be connected to the second-1 connection line CL2-1 by contacting the same through the contact hole CNT. The second-1 connection line CL2-1 may be connected to the transistor TR1 included in the even second stage EST_e and the transistor TR3 included in the even third stage GST_e, and apply the first clock signal to the connected transistors TR1 and TR3.

Among the second clock lines CKLP2, the second-2 clock line CKL4 may be connected to the even second stage EST_e and the even third stage GST_e by a second-2 connection line CL2-2. For example, the second-2 clock line CKL4 and the second-2 connection line CL2-2 may be arranged on different layers, and the second-2 clock line CKL4 may be connected to the second-2 connection line CL2-2 by contacting the same through the contact hole CNT. The second-2 connection line CL2-2 may be connected to the transistor TR2 included in the even second stage EST_e and the transistor TR4 included in the even third stage GST_e, and apply the third clock signal to the connected transistors TR2 and TR4.

The clock lines CKL may be connected to one of a source electrode, a drain electrode, and a gate electrode of a transistor, according to a configuration of each stage. The transistors TR1 and TR2 included in the second stage EST and the transistors TR3 and TR4 included in the third stage GST, which are connected to a shared clock line, may be bilaterally symmetrical with respect to a reference line (e.g., a virtual line extending in a y-axis direction passing through a center of an area between the transistor TR1 included in the second stage EST and the transistor TR3 included in the third stage GST in an x-axis direction) parallel to an extending direction (e.g., the y-axis direction) of the clock lines CKL arranged between the second stages EST and the third stages GST. In an embodiment of FIG. 11, the virtual line may be located between the second-1 clock line CKL2 and the first-2 clock line CKL3. In an x-y plan view (hereinafter, "in a plan view") perpendicular to a major surface of the substrate 100, the clock lines CKL arranged between the second stages EST and the third stages GST may not overlap the transistors TR1 to TR4 connected to the clock lines CKL and included in the plurality of second stages EST and the plurality of third stages GST, respectively.

Each of the first-1 connection line CL1-1, the first-2 connection line CL1-2, the second-1 connection line CL2-1, and the second-2 connection line CL2-2 may extend in the x-axis direction (a first direction). Each of the first-1 connection line CL1-1, the first-2 connection line CL1-2, the second-1 connection line CL2-1, and the second-2 connection line CL2-2 may partially overlap the first clock lines CKLP1 and the second clock lines CKLP2 in a plan view while traversing the first clock lines CKLP1 and the second clock lines CKLP2.

A virtual straight line VL1 in the x-axis direction, which passes through the contact hole CNT where the first-1 clock line CKL1 and the first-1 connection line CL1-1 are in contact with each other may be parallel to a virtual straight line VL2 in the x-axis direction, which passes through the contact hole CNT where the first-2 clock line CKL3 and the first-2 connection line CL1-2 are in contact with each other.

A virtual straight line VL3 in the x-axis direction, which passes through the contact hole CNT where the second-1 clock line CKL2 and the second-1 connection line CL2-1 are in contact with each other may be parallel to a virtual straight line VL4 in the x-axis direction, which passes through the contact hole CNT where the second-2 clock line CKL4 and the second-2 connection line CL2-2 are in contact with each other. In an embodiment, as shown in FIGS. 12, 13, and 14, the first clock lines CKLP1 and/or the second clock lines CKLP2 may overlap the second stages EST and the third stages GST.

Figure 12:
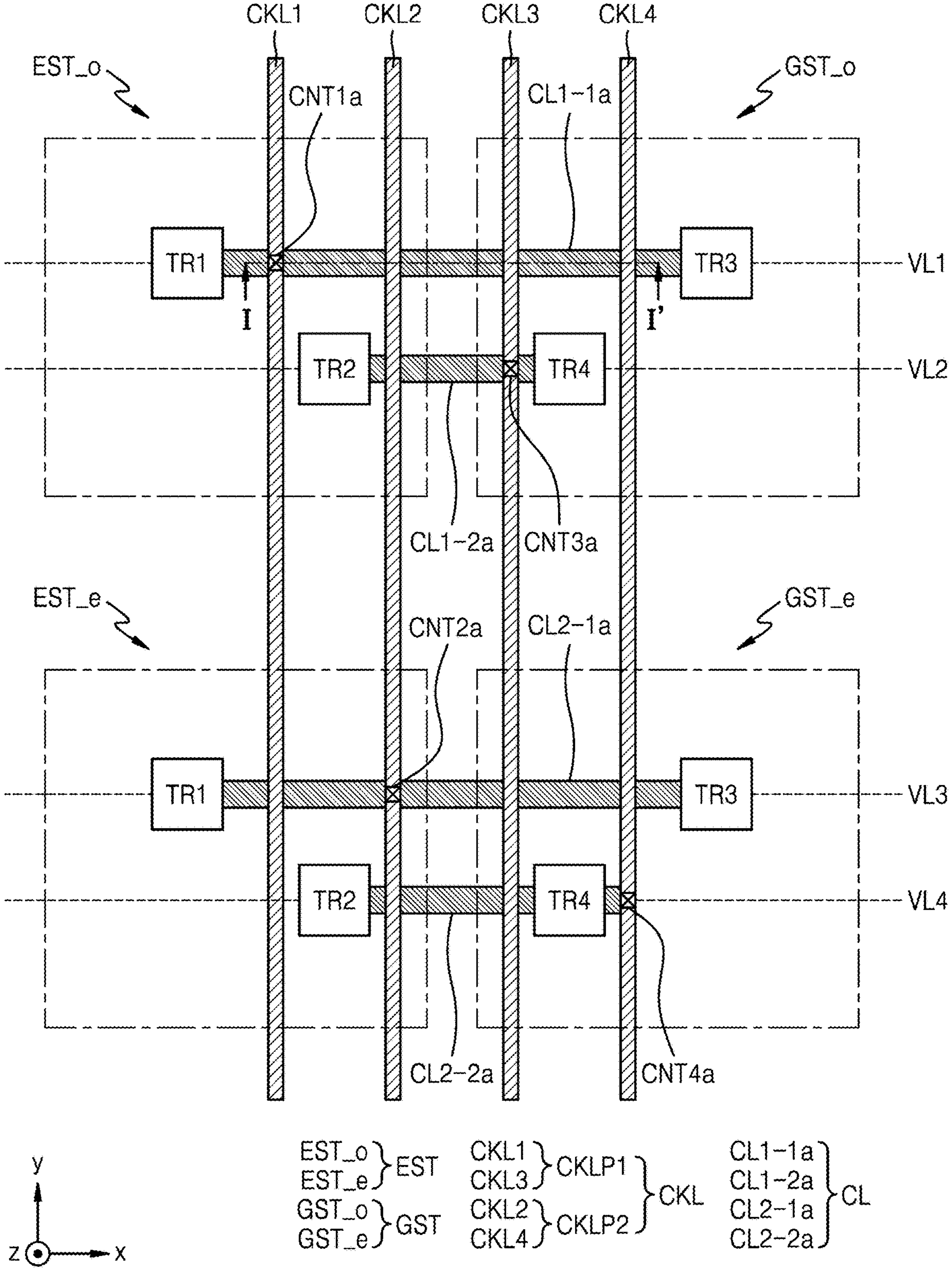
Figure 13:
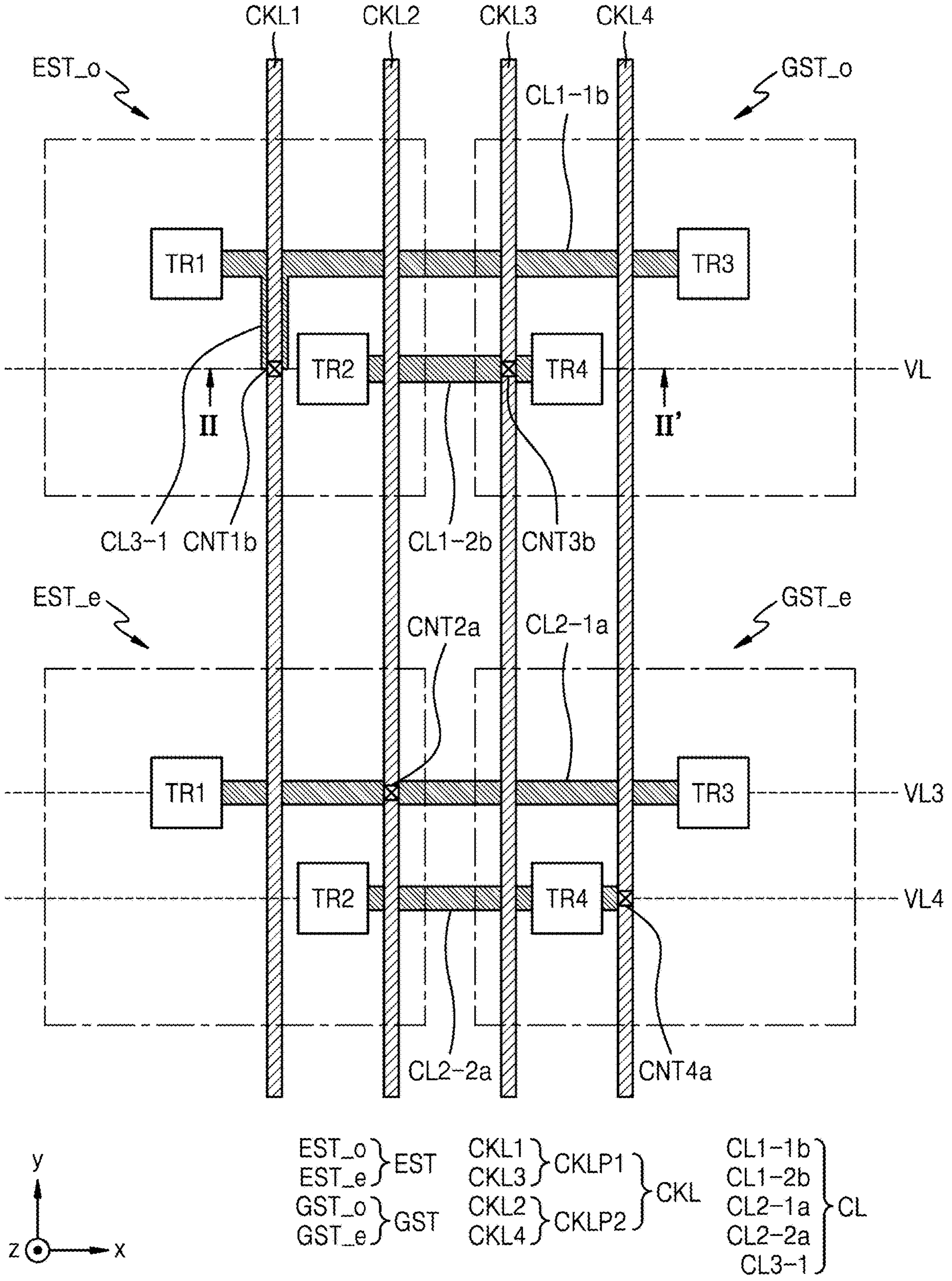
Figure 14:
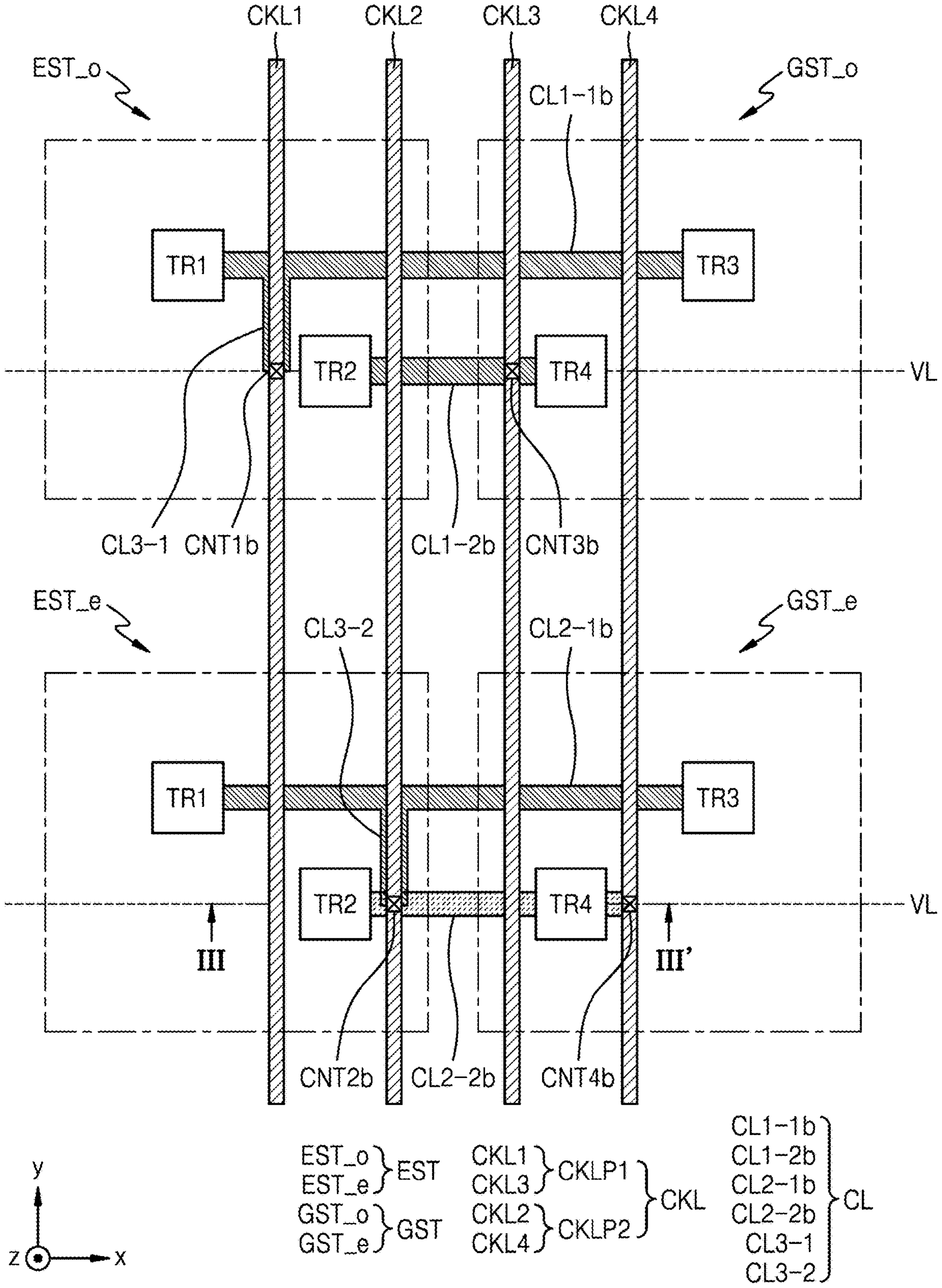

Referring to FIGS. 12, 13, and 14, the first clock lines CKLP1 and the second clock lines CKLP2 may be provided between the second stages EST and the third stages GST while partially overlapping the second stages EST and the third stages GST. In a plan view, some of transistors (a transistor TR connected to a connection line CL and other transistors) included in the plurality of second stages EST and the plurality of third stages GST may overlap portions and the clock lines CKL and/or connection line CL, and the remaining transistors may not overlap the clock lines CKL and/or connection line CL.

According to an embodiment, referring to FIG. 12, the first clock lines CKLP1 may be connected to a first-1 connection line CL1-1*a* and/or a first-2 connection line CL1-2*a* to apply the first clock signal to the odd second stage EST_o and the odd third stage GST_o.

The first-1 clock line CKL1 may be connected to the odd second stage EST_o and the odd third stage GST_o by the first-1 connection line CL1-1*a*. For example, the first-1 clock line CKL1 and the first-1 connection line CL1-1*a* may be arranged on different layers, and the first-1 clock line CKL1 may be connected to the first-1 connection line CL1-1*a* by contacting the same through a contact hole CNT1*a*. The first-1 connection line CL1-1*a* may be connected to the transistor TR1 included in the odd second stage EST_o and the transistor TR3 included in the odd third stage GST_o. The transistor TR1 and the transistor TR3, which are connected to the first-1 connection line CL1-1*a*, may receive the first clock signal from the first-1 clock line CKL1.

The first-2 clock line CKL3 may be connected to the odd second stage EST_o and the odd third stage GST_o by the first-2 connection line CL1-2*a*. For example, the first-2 clock line CKL3 and the first-2 connection line CL1-2*a* may be arranged on different layers, and the first-2 clock line CKL3 may be connected to the first-2 connection line CL1-2*a* by contacting the same through a contact hole CNT3*a*. The first-2 connection line CL1-2*a* may be connected to the transistor TR2 included in the odd second stage EST_o and the transistor TR4 included in the odd third stage GST_o. The transistor TR2 and the transistor TR4, which are connected to the first-2 connection line CL1-2*a*, may receive the third clock signal from the first-2 clock line CKL3.

The second clock lines CKLP2 may be connected to a second-1 connection line CL2-1*a* and/or a second-2 connection line CL2-2*a* and a clock signal may be applied to the even second stage EST_e and the even third stage GST_e.

The second-1 clock line CKL2 may be connected to the even second stage EST_e and the even third stage GST_e by the second-1 connection line CL2-1*a*. For example, the second-1 clock line CKL2 and the second-1 connection line CL2-1*a* may be arranged on different layers, and the second-1 clock line CKL2 may be connected to the second-1 connection line CL2-1*a* by contacting the same through a contact hole CNT2*a*. The second-1 connection line CL2-1*a* may be connected to the transistor TR1 included in the even second stage EST_e and the transistor TR3 included in the even third stage GST_e. The transistor TR1 and the transistor TR3, which are connected to the second-1 connection line CL2-1*a*, may receive the second clock signal from the second-1 clock line CKL2.

The second-2 clock line CKL4 may be connected to the even second stage EST_e and the even third stage GST_e by the second-2 connection line CL2-2*a*. For example, the second-2 clock line CKL4 and the second-1 connection line CL2-1*a* may be arranged on different layers, and the second-2 clock line CKL4 may be connected to the second-2 connection line CL2-2*a* by contacting the same through a contact hole CNT4*a*. The second-2 connection line CL2-2*a* may be connected to the transistor TR2 included in the even second stage EST_e and the transistor TR4 included in the even third stage GST_e. The transistor TR2 and the transistor TR4, which are connected to the second-2 connection line CL2-2*a*, may receive the fourth clock signal from the second-2 clock line CKL4.

Each of the first-1 connection line CL1-1*a*, the first-2 connection line CL1-2*a*, the second-1 connection line CL2-1*a*, and the second-2 connection line CL2-2*a* may extend in the x-axis direction (the first direction).

Each of the first-1 connection line CL1-1*a* and the second-1 connection line CL2-1*a* may partially overlap the first clock lines CKLP1 and the second clock lines CKLP2 in a plan view while traversing the first clock lines CKLP1 and the second clock lines CKLP2.

The first-2 connection line CL1-2*a* may partially overlap the second-1 clock line CKL2 and the first-2 clock line CKL3 in a plan view while traversing the second-1 clock line CKL2 and the first-2 clock line CKL3.

The second-2 connection line CL2-2*a* may partially overlap the second-1 clock line CKL2, the first-2 clock line CKL3, and the second-2 clock line CKL4 in a plan view while traversing the second-1 clock line CKL2, the first-2 clock line CKL3, and the second-2 clock line CKL4. According to an embodiment, the second-2 connection line CL2-2*a* may partially overlap the transistor TR4. According to an embodiment, a portion of the second-2 connection line CL2-2*a* may be one electrode (e.g., a gate electrode) of the transistor TR4.

The virtual straight line VL1 in the x-axis direction, which passes through the contact hole CNT1*a* where the first-1 clock line CKL1 and the first-1 connection line CL1-1*a* are in contact with each other may be parallel to the virtual straight line VL2 in the x-axis direction, which passes through the contact hole CNT3*a* where the first-2 clock line CKL3 and the first-2 connection line CL1-2*a* are in contact with each other.

The virtual straight line VL3 in the x-axis direction, which passes through the contact hole CNT2*a* where the second-1 clock line CKL2 and the second-1 connection line CL2-1*a* are in contact with each other may be parallel to the virtual straight line VL4 in the x-axis direction, which passes through the contact hole CNT4*a* where the second-2 clock line CKL4 and the second-2 connection line CL2-2*a* are in contact with each other.

According to an embodiment, referring to FIG. 13, the first clock lines CKLP1 may be connected to a first-1 connection line CL1-1*b* and/or a first-2 connection line CL1-2*b* to apply a clock signal to the odd second stage EST_o and the odd third stage GST_o.

The first-1 clock line CKL1 may be connected to the odd second stage EST_o and the odd third stage GST_o by the first-1 connection line CL1-1*b*. The first-1 connection line CL1-1*b* may extend in the x-axis direction and include a third-1 connection line CL3-1 protruding in the y-axis direction. The third-1 connection line CL3-1 may be a portion overlapping the first-1 clock line CKL1 in a plan view and integrated with the first-1 connection line CL1-1*b*. According to an embodiment, the first-1 clock line CKL1 and the first-1 connection line CL1-1*b* may be arranged on different layers, and the first-1 clock line CKL1 may be connected to the third-1 connection line CL3-1 of the first-1 connection line CL1-1*b* by contacting the same through a contact hole CNT1*b*. The first-1 connection line CL1-1*b* may be connected to the transistor TR1 included in the odd second stage EST_o and the transistor TR3 included in the odd third stage GST_o. The transistor TR1 and the transistor TR3, which are connected to the first-1 connection line CL1-1*b*, may receive the first clock signal from the first-1 clock line CKL1.

The first-2 clock line CKL3 may be connected to the odd second stage EST_o and the odd third stage GST_o by the first-2 connection line CL1-2*b*. According to an embodiment, the first-2 clock line CKL3 and the first-2 connection line CL1-2*b* may be arranged on different layers, and the first-2 clock line CKL3 may be connected to the first-2 connection line CL1-2*b* by contacting the same through a contact hole CNT3*b*. The first-2 connection line CL1-2*b* may be connected to the transistor TR2 included in the odd second stage EST_o and the transistor TR4 included in the odd third stage GST_o. The transistor TR2 and the transistor TR4, which are connected to the first-2 connection line CL1-2*b*, may receive the third clock signal from the first-2 clock line CKL3.

Connections between the even second stage EST_e and even third stage GST_e, and the second clock lines CKLP2, shown in FIG. 13, are the same as connections between the even second stage EST_e and even third stage GST_e, and the second clock lines CKLP2, shown in FIG. 12, and thus, detailed description thereof is not provided again.

Each of the first-1 connection line CL1-1*b*, the first-2 connection line CL1-2*b*, the second-1 connection line CL2-1*a*, and/or the second-2 connection line CL2-2*a* may extend in the first direction (the x-axis direction).

Each of the first-1 connection line CL1-1*b* and the second-1 connection line CL2-1*a* may partially overlap the first clock lines CKLP1 and the second clock lines CKLP2 in a plan view while traversing the first clock lines CKLP1 and the second clock lines CKLP2. The third-1 connection line CL3-1 that is a portion of the first-1 connection line CL1-1*b* may partially overlap the first-1 clock line CKL1.

The first-2 connection line CL1-2*b* may partially overlap the second-1 clock line CKL2 and the first-2 clock line CKL3 in a plan view while traversing the second-1 clock line CKL2 and the first-2 clock line CKL3.

The contact hole CNT1*b* where the first-1 clock line CKL1 and the first-1 connection line CL1-1*b* are in contact with each other, and the contact hole CNT3*b* where the first-2 clock line CKL3 and the first-2 connection line CL1-2*b* are in contact with each other may be located on a virtual straight line VL in the x-axis direction.

The virtual straight line VL3 in the x-axis direction, which passes through the contact hole CNT2*a* where the second-1 clock line CKL2 and the second-1 connection line CL2-1*a* are in contact with each other may be parallel to the virtual straight line VL4 in the x-axis direction, which passes through the contact hole CNT4*a* where the second-2 clock line CKL4 and the second-2 connection line CL2-2*a* are in contact with each other.

According to an embodiment, in the peripheral area PA, the first-1 clock line CKL1, the first-2 clock line CKL3, the second-1 clock line CKL2, and the second-2 clock line CKL4 may be arranged on the same layer as the data line DL and driving voltage line VDL of the display area DA shown in FIG. 3A. The first-1 connection lines (CL1-1 (of FIG. 11, CL1-1*a* of FIG. 12, and CL1-1*b* of FIG. 13), the first-2 connection lines (CL1-2 of FIG. 11, CL1-2*a* of FIG. 12, and CL1-2*b* of FIG. 13), the second-1 connection lines (CL2-1 of FIG. 11 and CL2-1*a* of FIGS. 12 and 13), and the second-2 connection lines (CL2-2 of FIG. 11 and CL2-2*a* of FIGS. 12 and 13) may be formed on the same layer as the first source electrode 167, the first drain electrode 177, the second source electrode 187, and the second drain electrode 197 of the display area DA shown in FIG. 3A. The plurality of contact holes CNT where the connection lines CL and the clock lines CKL are in contact with each other may be defined in the sixth insulating layer 116 of FIG. 3A.

According to an embodiment, in the peripheral area PA, the first-1 clock line CKL1, the first-2 clock line CKL3, the second-1 clock line CKL2, and the second-2 clock line CKL4 may be arranged on the same layer as the driving voltage line VDL of the display area DA shown in FIG. 3B. The first-1 connection lines (CL1-1 of FIG. 11, CL1-1*a* of FIG. 12, and CL1-1*b* of FIG. 13), the first-2 connection lines (CL1-2 of FIG. 11, CL1-2*a* of FIG. 12, and CL1-2*b* of FIG. 13), the second-1 connection lines (CL2-1 of FIG. 11 and CL2-1*a* of FIGS. 12 and 13), and the second-2 connection lines (CL2-2 of FIG. 11 and CL2-2*a* of FIGS. 12 and 13) may be arranged on the same layer as the data line DL of the display area DA shown in FIG. 3B. The plurality of contact holes CNT where the connection lines CL and the clock lines CKL are in contact with each other may be defined in the seventh insulating layer 117 of FIG. 3B.

In the embodiment of FIG. 13, contact holes where connection lines and clock lines supplying clock signals to the odd second stage EST_o and odd third stage GST_o are in contact with each other, are located on one virtual straight line VL, and contact holes where connection lines and clock lines supplying clock signals to the even second stage EST_e and even third stage GST_e are in contact with each other, are located on different virtual straight lines VL3 and VL4.

According to an embodiment, as shown in FIG. 14, contact holes where connection lines and clock lines supplying clock signals to the even second stage EST_e and even third stage GST_e are in contact with each other, may also be located on one virtual straight line VL. Hereinafter, description about details that are same as those of FIG. 11 will be omitted and differences will be mainly described.

The second-1 clock line CKL2 may be connected to the even second stage EST_e and the even third stage GST_e by the second-1 connection line CL2-1*b*. The second-1 connection line CL2-1*b* may extend in the x-axis direction and include a third-2 connection line CL3-2 protruding in the y-axis direction. The third-2 connection line CL3-2 may be a portion overlapping the second-1 clock line CKL2 in a plan view and integrated with the second-1 connection line CL2-1*b*. According to an embodiment, the second-1 clock line CKL2 and the second-1 connection line CL2-1*b* may be arranged on different layers, and the second-1 clock line CKL2 may be connected to the third-2 connection line CL3-2 of the second-1 connection line CL2-1*b* by contacting the same through a contact hole CNT2*b*. The second-1 connection line CL2-1*b* may be connected to the transistor TR1 included in the even second stage EST_e and the transistor TR3 included in the even third stage GST_e. The transistor TR1 and the transistor TR3, which are connected to the second-1 connection line CL2-1*b*, may receive the second clock signal from the second-1 clock line CKL2.

The third-2 connection line CL3-2 of the second-1 connection line CL2-1*b* may partially overlap a second-2 connection line CL2-2*b*. For example, the second-1 connection line CL2-1*b* and the second-2 connection line CL2-2*b* may be arranged on different layers.

The second-1 connection line CL2-1*b* may extend in the first direction (the x-axis direction) and partially overlap the first clock lines CKLP1 and the second clock lines CKLP2 in a plan view while traversing the first clock lines CKLP1 and the second clock lines CKLP2. The third-2 connection line CL3-2 that is a portion of the second-1 connection line CL2-1*b* may partially overlap the second-1 clock line CKL2 and the second-2 connection line CL2-2*b*.

The second-2 connection line CL2-2*b* may partially overlap the second-1 clock line CKL2, the first-2 clock line CKL3, and the second-2 clock line CKL4 in a plan view while traversing the second-1 clock line CKL2, the first-2 clock line CKL3, and the second-2 clock line CKL4.

The contact hole CNT2*b* where the second-1 clock line CKL2 and the second-1 connection line CL2-1*b* are in contact with each other, and a contact hole CNT4*b* where the second-2 clock line CKL4 and the second-2 connection line CL2-2*b* are in contact with each other may be located on the virtual straight line VL in the x-axis direction.

According to an embodiment, in the peripheral area PA, the first-1 clock line CKL1, the first-2 clock line CKL3, the second-1 clock line CKL2, and the second-2 clock line CKL4 may be arranged on the same layer as the data line DL and driving voltage line VDL of the display area DA shown in FIG. 3A. The first-1 connection line CL1-1*b*, the first-2 connection line CL1-2*b*, and the second-1 connection line CL2-1*b* may be formed on the same layer as the first source electrode 167, the first drain electrode 177, the second source electrode 187, and the second drain electrode 197 of the display area DA shown in FIG. 3A. The second-2 connection line CL2-2*b* may be formed on the same layer as the gate electrode GE1 or the second gate electrode GEb of the display area DA shown in FIG. 3A. The plurality of contact holes CNT where the connection lines CL and the clock lines CKL are in contact with each other may be defined in the sixth insulating layer 116 and the fifth insulating layer 115 or in the fifth insulating layer 115, the third insulating layer 113, and the second insulating layer 112 of FIG. 3A.

According to an embodiment, in the peripheral area PA, the first-1 clock line CKL1, the first-2 clock line CKL3, the second-1 clock line CKL2, and the second-2 clock line CKL4 may be arranged on the same layer as the driving voltage line VDL of the display area DA shown in FIG. 3B. The first-1 connection line CL1-1*b*, the first-2 connection line CL1-2*b*, and the second-1 connection line CL2-1*b* may be formed on the same layer as the data line DL of the display area DA shown in FIG. 3B. The second-2 connection line CL2-2*b* may be formed on the same layer as the gate electrode GE1 or the second gate electrode GEb of the display area DA shown in FIG. 3B. The plurality of contact holes CNT where the connection lines CL and the clock lines CKL are in contact with each other may be defined in the seventh insulating layer 117, the sixth insulating layer 116, and the fifth insulating layer 115 or in the sixth insulating layer 116, the fifth insulating layer 115, the third insulating layer 113, and the second insulating layer 112 of FIG. 3B.

Although not illustrated, the plurality of fourth stages IST included in the fourth driving circuit 137 and the plurality of fifth stages CST included in the fifth driving circuit 139, which output gate signals during the first scan period DS and the second scan period SS, may also share a plurality of clock lines as in the various embodiments of FIGS. 10A, 10B, 11, 12, 13, and 14.

Figure 15A:
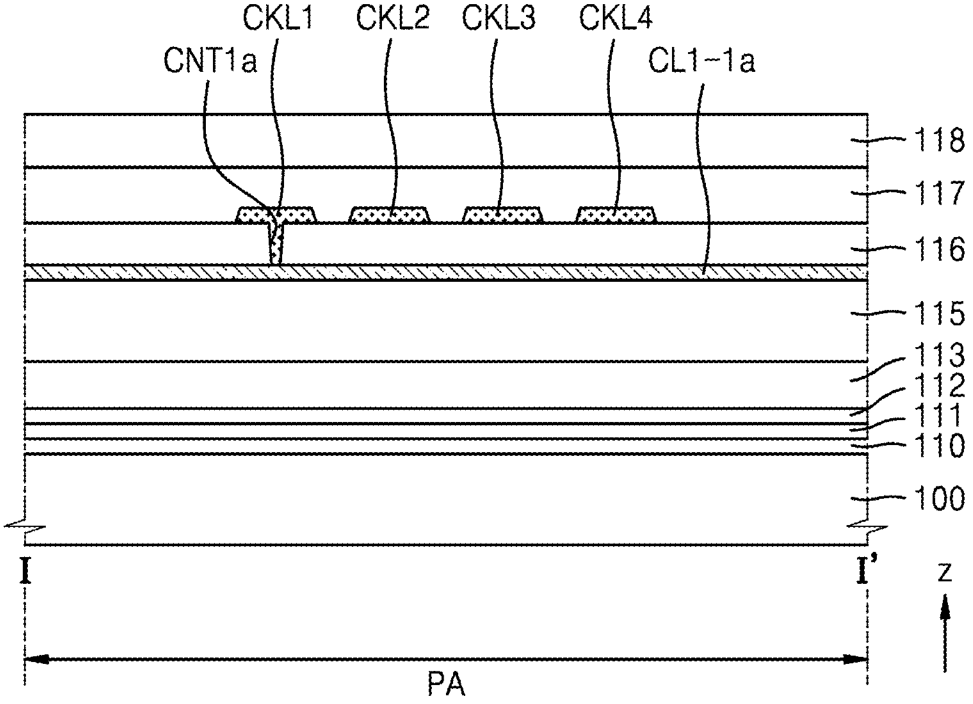
FIGS. 15A and 15B are cross-sectional views of the stage taken along line I-I' of FIG. 12, according to an embodiment.
Figure 15B:
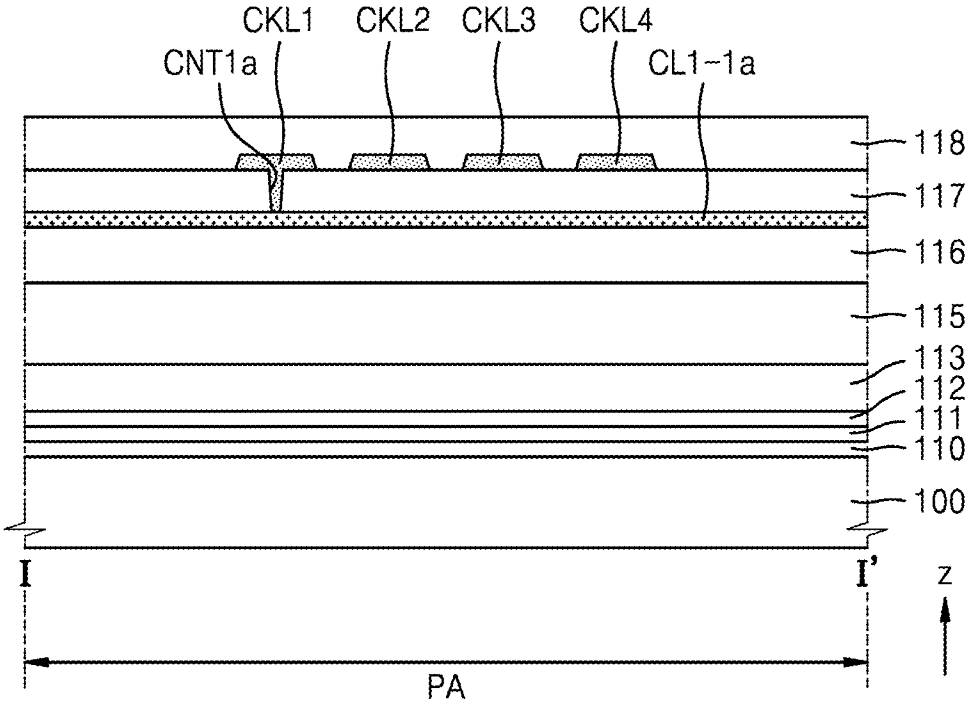
Figure 16A:
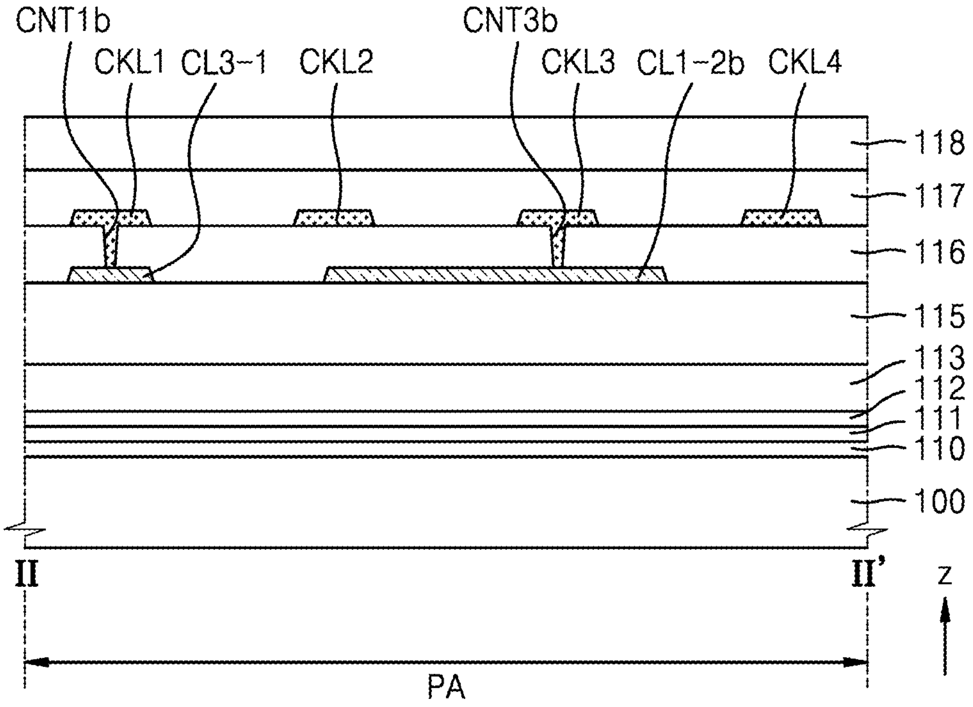
FIGS. 16A and 16B are cross-sectional views of the stage taken along line II-II' of FIG. 13, according to an embodiment.
Figure 16B:
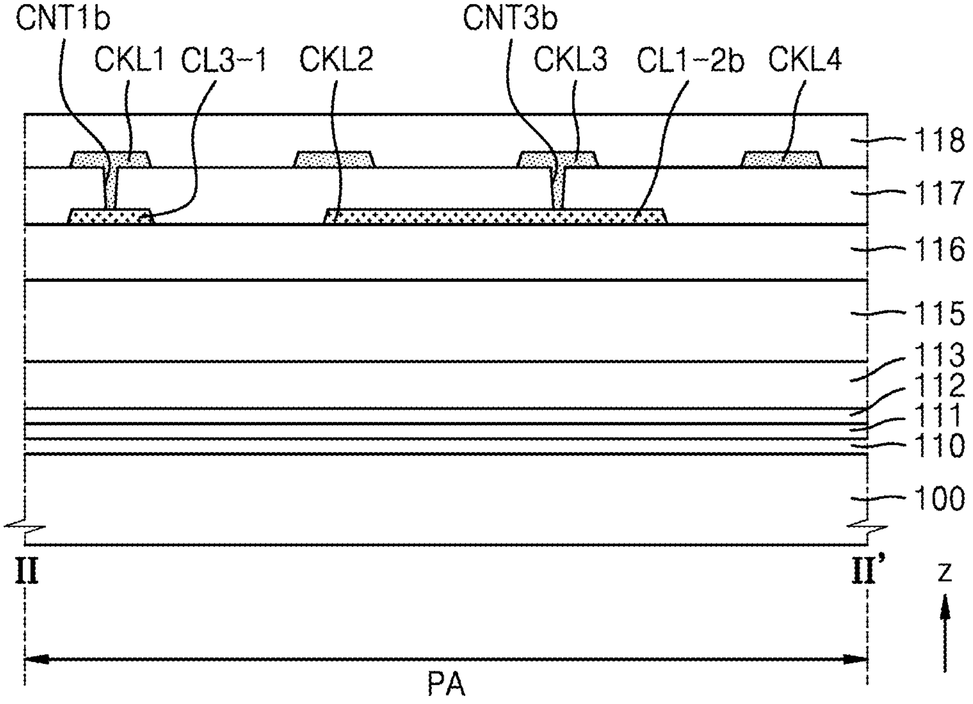
Figure 17A:
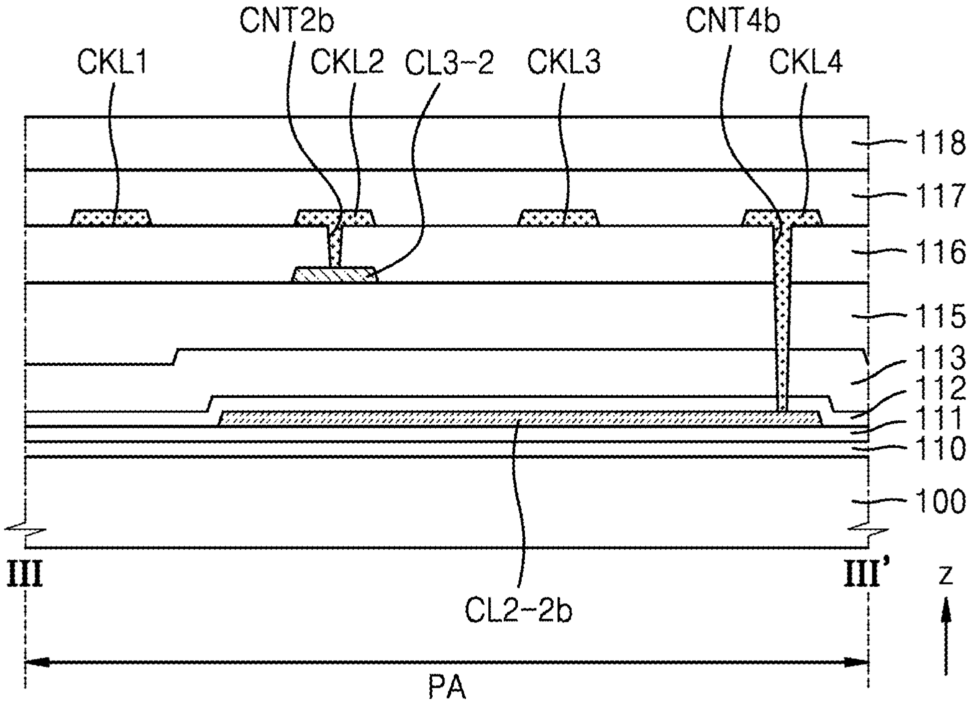
FIGS. 17A and 17B are cross-sectional views of the stage taken along line III-III' of FIG. 14, according to an embodiment.
Figure 17B:
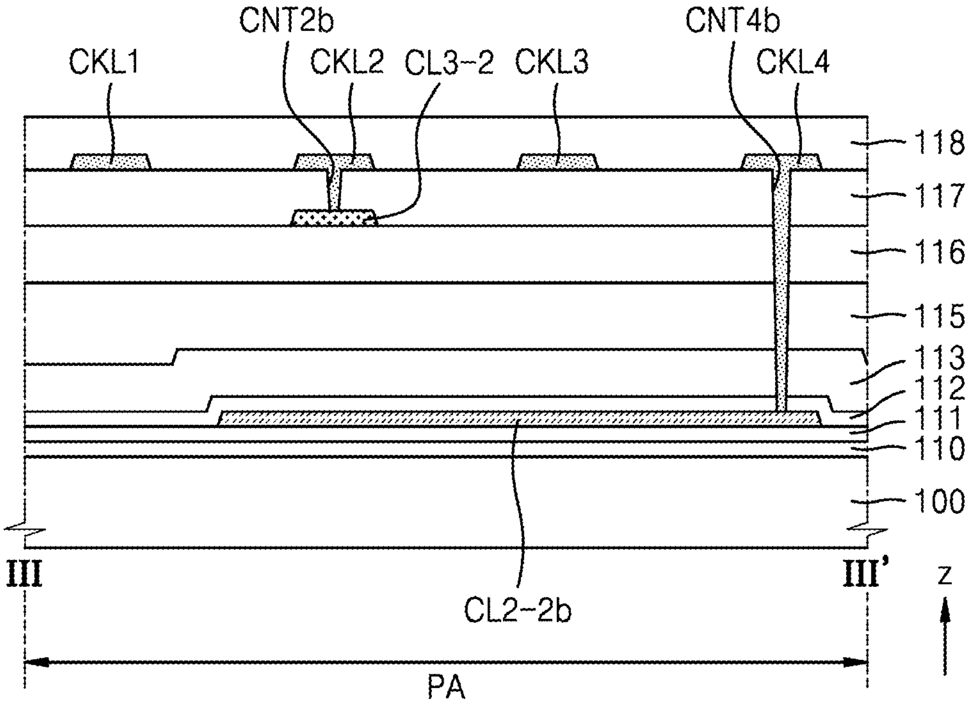

FIGS. 15A and 15B are cross-sectional views of the stages taken along line I-I' of FIG. 12, according to an embodiment. FIGS. 16A and 16B are cross-sectional views of the stages taken along line II-II' of FIG. 13, according to an embodiment. FIGS. 17A and 17B are cross-sectional views of the stages taken along line III-III' of FIG. 14, according to an embodiment. Hereinafter, description about redundant details of same components will be omitted.

According to an embodiment, referring to FIGS. 3A and 15A, the first-1 connection line CL1-1*a* in the peripheral area PA may be formed on the same layer as the first source electrode 167, first drain electrode 177, second source electrode 187, and second drain electrode 197 of the display area DA. The first-1 connection line CL1-1*a* may be arranged above the fifth insulating layer 115. In the peripheral area PA, the first-1 clock line CKL1, the first-2 clock line CKL3, the second-1 clock line CKL2, and the second-2 clock line CKL4 may be arranged above the sixth insulating layer 116. According to an embodiment, in the peripheral area PA, the first-1 clock line CKL1, the first-2 clock line CKL3, the second-1 clock line CKL2, and the second-2 clock line CKL4 may be arranged on the same layer as the data line DL and driving voltage line VDL of the display area DA. The first-1 clock line CKL1 may be connected to the first-1 connection line CL1-1*a* through the contact hole CNT1*a* penetrating the sixth insulating layer 116, and the first clock signal may be transmitted from the first-1 clock line CKL1 to each of the odd second stage EST_o and odd third stage GST_o through the first-1 connection line CL1-1*a*.

According to an embodiment, referring to FIGS. 3B and 15B, in the peripheral area PA, the first-1 connection line CL1-1*a* may be arranged above the sixth insulating layer 116. In the peripheral area PA, the first-1 clock line CKL1, the first-2 clock line CKL3, the second-1 clock line CKL2, and the second-2 clock line CKL4 may be arranged above the seventh insulating layer 117. According to an embodiment, in the peripheral area PA, the first-1 connection line CL1-1*a* may be arranged on the same layer as the data line DL of the display area DA and the first-1 clock line CKL1, the first-2 clock line CKL3, the second-1 clock line CKL2, and the second-2 clock line CKL4 may be arranged on the same layer as the driving voltage line VDL of the display area DA. The first-1 clock line CKL1 may be connected to the first-1 connection line CL1-1*a* through the contact hole CNT1*a* penetrating the seventh insulating layer 117, and the first clock signal may be transmitted from the first-1 clock line CKL1 to each of the odd second stage EST_o and odd third stage GST_o.

According to an embodiment, referring to FIGS. 3A and 16A, the first-2 connection line CL1-2*b* in the peripheral area PA may be formed on the same layer as the first source electrode 167, first drain electrode 177, second source electrode 187, and second drain electrode 197 of the display area DA. The first-2 connection line CL1-2*b* may be arranged above the fifth insulating layer 115. The first-1 clock line CKL1 may be connected to the third-1 connection line CL3-1 protruding and extending from the first-2 connection line CL1-2*b*, through the contact hole CNT1*b* penetrating the sixth insulating layer 116, and the first clock signal may be transmitted from the first-1 clock line CKL1 to each of the odd second stage EST_o and the odd third stage GST_o through the third-1 connection line CL3-1. The first-2 clock line CKL3 may be connected to the first-2 connection line CL1-2*b* through the contact hole CNT3*b* penetrating the sixth insulating layer 116, and the third clock signal may be transmitted from the first-2 clock line CKL3 to each of the odd second stage EST_o and the odd third stage GST_o through the first-2 connection line CL1-2*b*.

According to an embodiment, referring to FIGS. 3B and 16B, in the peripheral area PA, the first-2 connection line CL1-2*b* may be arranged above the sixth insulating layer 116. In the peripheral area PA, the first-1 clock line CKL1 and the first-2 clock line CKL3 may be arranged above the seventh insulating layer 117. According to an embodiment, in the peripheral area PA, the first-2 connection line CL1-2*b* may be arranged on the same layer as the data line DL of the display area DA and the first-1 clock line CKL1 and the first-2 clock line CKL3 may be arranged on the same layer as the driving voltage line VDL of the display area DA. The first-1 clock line CKL1 may be connected to the third-1 connection line CL3-1 protruding and extending from the first-1 connection line CL1-1*b*, through the contact hole CNT1*b* penetrating the seventh insulating layer 117, and the first clock signal may be transmitted from the first-1 clock line CKL1 to each of the odd second stage EST_o and the odd third stage GST_o. The first-2 clock line CKL3 may be connected to the first-2 connection line CL1-2*b* through the contact hole CNT3*b* penetrating the seventh insulating layer 117, and the third clock signal may be transmitted from the first-2 clock line CKL3 to each of the odd second stage EST_o and odd third stage GST_o.

According to an embodiment, referring to FIGS. 3A and 17A, in the peripheral area PA, the second-1 connection line CL2-1*b* may be arranged above the fifth insulating layer 115 and the second-2 connection line CL2-2*b* may be arranged above the first insulating layer 111. In the peripheral area PA, the first-1 clock line CKL1, the first-2 clock line CKL3, the second-1 clock line CKL2, and the second-2 clock line CKL4 may be arranged above the sixth insulating layer 116. The second-1 clock line CKL2 may be connected to the third-2 connection line CL3-2 protruding and extending from the second-1 connection line CL2-1*b*, through the contact hole CNT2*b* penetrating the sixth insulating layer 116, and the second clock signal may be transmitted from the second-1 clock line CKL2 to each of the even second stage EST_e and the even third stage GST_e. The second-2 clock line CKL4 may be connected to the second-2 connection line CL2-2*b* through the contact hole CNT4*b* penetrating the second insulating layer 112, third insulating layer 113, fifth insulating layer 115, sixth insulating layer 116, and seventh insulating layer 117, and the fourth clock signal may be transmitted from the second-2 clock line CKL4 to each of the even second stage EST_e and the even third stage GST_e.

According to an embodiment, referring to FIG. 17B, in the peripheral area PA, the second-2 connection line CL2-2*b* may be arranged above the first insulating layer 111. In the peripheral area PA, the first-1 clock line CKL1, the first-2 clock line CKL3, the second-1 clock line CKL2, and the second-2 clock line CKL4 may be arranged above the seventh insulating layer 117. The second-1 clock line CKL2 may be connected to the third-2 connection line CL3-2 protruding and extending from the second-1 connection line CL2-1*b*, through the contact hole CNT2*b* penetrating the seventh insulating layer 117, and the second clock signal may be transmitted from the second-1 clock line CKL2 to each of the even second stage EST_e and the even third stage GST_e. The second-2 clock line CKL4 may be connected to the second-2 connection line CL2-2*b* through the contact hole CNT4*b* penetrating the second insulating layer 112, third insulating layer 113, fifth insulating layer 115, sixth insulating layer 116, and seventh insulating layer 117, and the fourth clock signal may be transmitted from the second-2 clock line CKL4 to each of the even second stage EST_e and the even third stage GST_e.

In FIGS. 16A to 17B, for convenience of illustration, the transistors TR2 and TR4 connected to the first-2 connection line CL1-2*b* and second-2 connection line CL2-2*b* are not shown. The transistors TR2 and TR4 may be implemented as the third thin-film transistor PTFT shown in FIGS. 3A and 3B, and the first-2 connection line CL1-2*b* and the second-2 connection line CL2-2*b* may be directly connected to the source electrode, the drain electrode, or the gate electrode of the transistors TR2 and TR4 or indirectly connected thereto through connection electrodes arranged in the first to sixth insulating layers 111 to 116.

Figure 18A:
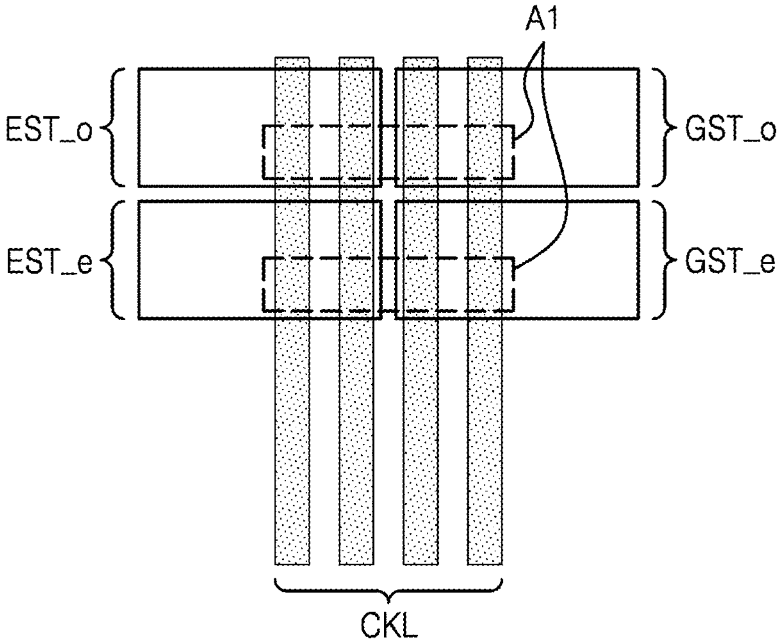
FIGS. 18A and 18B are diagrams showing a certain area of a gate driving circuit in which a transistor is not arranged, according to an embodiment.
Figure 18B:
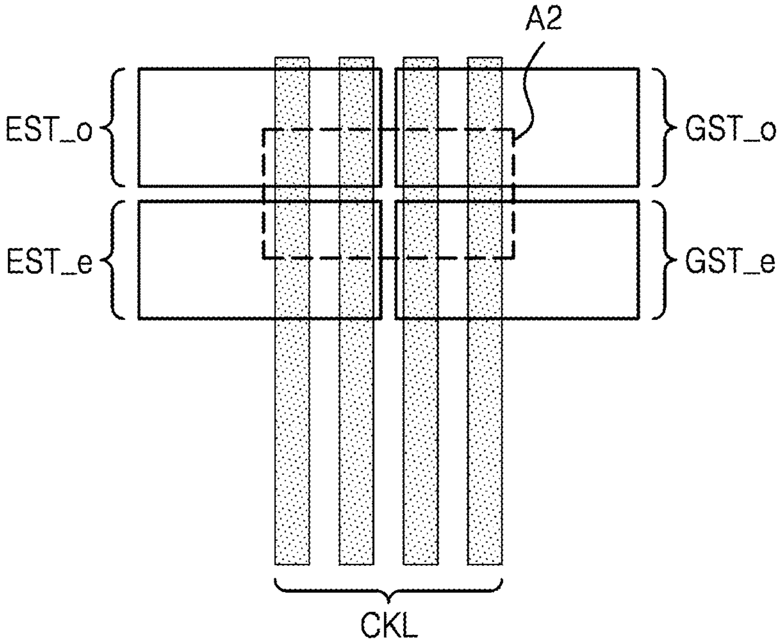

FIGS. 18A and 18B are diagrams showing a certain area of a gate driving circuit in which a transistor is not arranged, according to an embodiment.

Referring to FIGS. 18A and 18B, in a plan view, the clock lines CKL may partially overlap the odd second stages EST_o and the odd third stages GST_o, and may also partially overlap the even second stages EST_e and the even third stages GST_e. The plurality of second stages and the plurality of third stages may be arranged in the y-axis direction. The clock lines CKL may correspond to the first clock lines CKLP1 and the second clock lines CKLP2 of FIGS. 11, 12, 13, and 14.

Referring to FIG. 18A, from among areas where the clock lines CKL overlap the odd second stage EST_o and the odd third stage GST_o, transistors included in stages may not be arranged in a pre-determined certain area A1. In other words, a plurality of transistors for driving a stage may be arranged in areas excluding the pre-determined certain area A1 from each stage. The pre-determined certain area A1 may be set in each of the plurality of second stages and/or the plurality of third stages sharing the clock lines CKL. According to an embodiment, the pre-determined certain area A1 may be set in a bottom portion of a stage from among areas where the clock lines CKL overlap the odd second stage EST_o and the odd third stage GST_o, and in a bottom portion of a stage from among areas where the clock lines CKL overlap the even second stage EST_e and the even third stage GST_e.

Referring to FIG. 18B, transistors included in a stage may not be arranged in a pre-determined certain area A2 from among areas where the clock lines CKL overlap the odd second stage EST_o and the odd third stage GST_o and in the pre-determined certain area A2 from among areas where the clock lines CKL overlap the even second stage EST_e and the even third stage GST_e. In other words, a plurality of transistors for driving a stage may be arranged in areas excluding the pre-determined certain area A2 from each stage. According to an embodiment, a pre-determined certain area from among the areas where the clock lines CKL overlap the odd second stage EST_o and the odd third stage GST_o and a pre-determined certain area from among the areas where the clock lines CKL overlap the even second stage EST_e and the even third stage GST_e may be set differently. For example, the pre-determined certain area A2 may be set in a bottom portion of a stage from among the areas where the clock lines CKL overlap the odd second stage EST_o and the odd third stage GST_o, or in a top portion of a stage from among the areas where the clock lines CKL overlap the even second stage EST_e and the even third stage GST_e.

Transistors for driving a stage are not arranged in a pre-determined certain area from among areas where the clock lines CKL overlap the second stages and the third stages, and thus, a space for performing a contact process of connecting a clock line and a connection line, according to the embodiments of FIGS. 11, 12, 13, and 14, may be secured.

A display apparatus according to an embodiment may be a display apparatus such as an organic light-emitting display, an inorganic light-emitting display (or an inorganic EL display), or a quantum dot light-emitting display.

Figure 19:
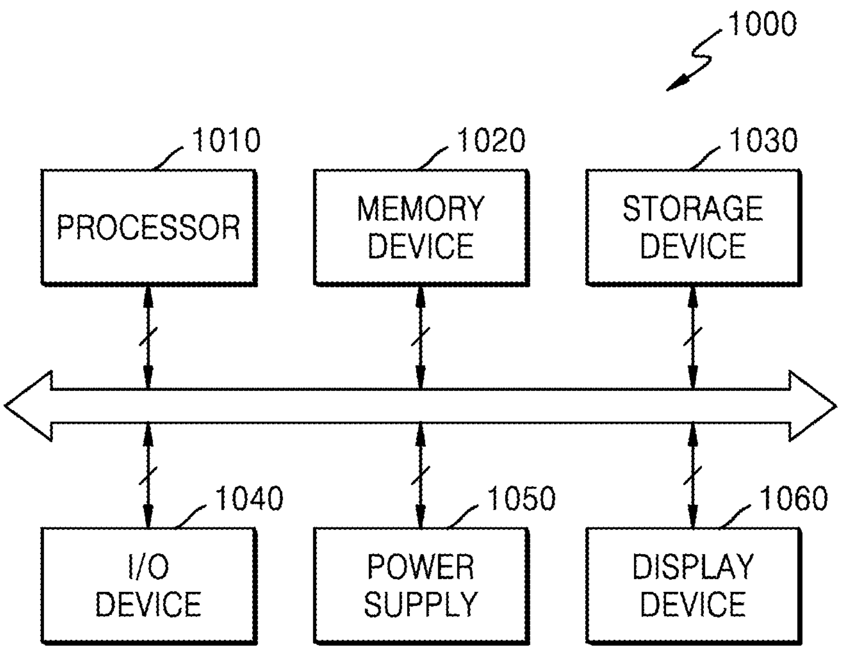
FIG. 19 is a block diagram illustrating an electronic device according to an embodiment.

FIG. 19 is a block diagram illustrating an electronic device according to an embodiment.

Referring to FIG. 19, in an embodiment, an electronic device 1000 may include a processor 1010, a memory device 1020, a storage device 1030, an input/output ("I/O") device 1040, a power supply 1050, and a display device 1060. Here, the display device 1060 may correspond to the display apparatus 1 of FIG. 1A or 1B. The electronic device 1000 may further include a plurality of ports for communicating with a video card, a sound card, a memory card, a universal serial bus ("USB") device, or the like. The display device 1060 is an apparatus for displaying a moving image or a still image and may visually provide information to a user. The display device 1060 may be used as a display screen of not only to a portable electronic device, such as a mobile phone, a smartphone, a tablet personal computer ("PC"), a mobile communication terminal, an electronic notebook, an electronic book, a portable multimedia player ("PMP"), a navigation device, an ultra-mobile PC ("UMPC"), or a smart watch or smart band worn on a wrist, but also to any one of various products, such as a television, a laptop computer, a monitor, a billboard, and an Internet of things ("IoT") device.

The processor 1010 may perform various computing functions. In an embodiment, the processor 1010 may be a microprocessor, a central processing unit ("CPU"), an application processor ("AP"), or the like. The processor 1010 may be coupled to other components via an address bus, a control bus, a data bus, or the like. In an embodiment, the processor 1010 may be coupled to an extended bus such as a peripheral component interconnection ("PCI") bus.

The memory device 1020 may store data for operations of the electronic device 1000. In an embodiment, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, or the like, and/or at least one volatile memory device such as a dynamic random access memory ("DRAM") device, a static random access memory ("SRAM") device, a mobile DRAM device, or the like.

In an embodiment, the storage device 1030 may include a solid state drive ("SSD") device, a hard disk drive ("HDD") device, a CD-ROM device, or the like. In an embodiment, the I/O device 1040 may include an input device such as a keyboard, a keypad, a mouse device, a touchpad, a touch-screen, or the like, and an output device such as a printer, a speaker, or the like.

The power supply 1050 may provide power for operations of the electronic device 1000. The power supply 1050 may provide power to the display device 1060. The display device 1060 may be coupled to other components via the buses or other communication links. In an embodiment, the display device 1060 may be included in the I/O device 1040.

According to an embodiment, provided is a display apparatus or an electronic device including the display apparatus in which power consumption is reduced by reducing the number of clock lines configured to supply a clock signal to a gate driving circuit. The effects of the disclosure are not limited to those mentioned above, and other effects that are not mentioned may be clearly understood by one of ordinary skill in the art from the detailed description.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:

a plurality of pixels arranged in a display area; and a driving circuit arranged in a peripheral area outside the display area and configured to output a gate signal to the plurality of pixels, wherein each of the plurality of pixels comprises:

a driving transistor configured to output a driving current corresponding to a data signal;

a light-emitting element configured to emit light with luminance corresponding to the driving current;

a first transistor diode-connecting the driving transistor;

a second transistor configured to transmit a first initialization voltage to a gate of the driving transistor;

a third transistor configured to transmit a driving voltage to the driving transistor; and a fourth transistor configured to transmit a second initialization voltage to a pixel electrode of the light-emitting element, the driving circuit comprises:

a first driving circuit configured to output a first gate signal to the first transistor;

a second driving circuit configured to output a second gate signal to the second transistor;

a third driving circuit configured to output a third gate signal to the third transistor; and a fourth driving circuit configured to output a fourth gate signal to the fourth transistor, the plurality of pixels are configured to operate in a first driving period during which light is emitted in response to a pre-written data signal, and a second driving period during which a new data signal is written and light is emitted in response to the new data signal, the third driving circuit is configured to output the third gate signal for turning the third transistor on in each of the first driving period and the second driving period, the fourth driving circuit is configured to output the fourth gate signal for turning the fourth transistor on in each of the first driving period and the second driving period, and the third driving circuit and the fourth driving circuit share a clock line.

2. The display apparatus of claim 1, wherein each of the third driving circuit and the fourth driving circuit comprises a plurality of stages, the third gate signal output by each of the plurality of stages of the third driving circuit is simultaneously supplied to third gate lines arranged on two or more rows, and the fourth gate signal output by each of the plurality of stages of the fourth driving circuit is simultaneously supplied to fourth gate lines arranged on two or more rows.

3. The display apparatus of claim 2, wherein the clock line comprises:

a pair of first clock lines extending in a first direction and connected to odd stages from among the plurality of stages of the third driving circuit and odd stages from among the plurality of stages of the fourth driving circuit; and a pair of second clock lines extending in the first direction and connected to even stages from among the plurality of stages of the third driving circuit and even stages from among the plurality of stages of the fourth driving circuit.

4. The display apparatus of claim 3, further comprising a connection line extending in a second direction perpendicular to the first direction and electrically connected to the clock line, wherein the connection line comprises:

a pair of first connection lines connected to the pair of first clock lines; and a pair of second connection lines connected to the pair of second clock lines.

5. The display apparatus of claim 4, wherein each of the odd stages of the third driving circuit comprises first transistors connected to the pair of first connection lines, each of the odd stages of the fourth driving circuit comprises second transistors connected to the pair of first connection lines, and the first transistors and the second transistors are symmetrical with respect to a virtual line extending along the first direction and located between each of the plurality of stages of the third driving circuit and a corresponding stage of the fourth driving circuit.

6. The display apparatus of claim 4, wherein the connection line and the clock line are arranged on different layers from each other with an insulating layer therebetween, a plurality of contact holes in contact with the connection line and the clock line are defined in the insulating layer, and from among the plurality of contact holes, a first contact hole in contact with one of the pair of first clock lines and one of the pair of first connection lines and a second contact hole in contact with another one of the pair of first clock lines and another one of the pair of first connection lines are located on a same virtual straight line extending along the second direction in a plan view.

7. The display apparatus of claim 6, wherein from among the plurality of contact holes, a virtual straight line extending along the second direction and passing through a third contact hole in contact with one of the pair of second clock lines and one of the pair of second connection lines, and a virtual straight line extending along the second direction and passing through a fourth contact hole in contact with another one of the pair of second clock lines and another one of the pair of second connection lines are parallel to each other in the plan view.

8. The display apparatus of claim 4, wherein the connection line is arranged in a same layer as a source electrode and a drain electrode of a transistor arranged in the display area, and the clock line is arranged in a same layer as a data line and a driving voltage line of the display area.

9. The display apparatus of claim 4, wherein the connection line is arranged in a same layer as a data line of the display area and the clock line is arranged in a same layer as a driving voltage line of the display area.

10. The display apparatus of claim 3, wherein, in a plan view, the clock line partially overlaps each of the plurality of stages of the third driving circuit and each of the plurality of stages of the fourth driving circuit.

11. The display apparatus of claim 1, wherein the third driving circuit and the fourth driving circuit are arranged adjacent to one of a left side and a right side of the display area.

12. The display apparatus of claim 1, wherein each of the first driving circuit and the second driving circuit comprises a plurality of stages, the first gate signal output by each of the plurality of stages of the first driving circuit is simultaneously supplied to first gate lines arranged on two or more rows, and the second gate signal output by each of the plurality of stages of the second driving circuit is simultaneously supplied to second gate lines arranged on two or more rows.

13. The display apparatus of claim 1, wherein each of the plurality of pixels further comprises a fifth transistor configured to transmit the data signal to the driving transistor, the driving circuit further comprises a fifth driving circuit configured to output a fifth gate signal to the fifth transistor, the fifth driving circuit comprises a plurality of stages, and the fifth gate signal output by each of the plurality of stages of the fifth driving circuit is supplied to a fifth gate line arranged on a corresponding row.

14. An electronic device comprising:

a plurality of pixels arranged in a display area; and a driving circuit arranged in a peripheral area outside the display area and configure to output a gate signal to the plurality of pixels, wherein each of the plurality of pixels comprises:

a driving transistor configured to output a driving current corresponding to a data signal;

a light-emitting element configured to emit light with luminance corresponding to the driving current;

a first transistor diode-connecting the driving transistor;

a second transistor configured to transmit a first initialization voltage to a gate of the driving transistor;

a third transistor configured to transmit a driving voltage to the driving transistor; and a fourth transistor configured to transmit a second initialization voltage to a pixel electrode of the light-emitting element, the driving circuit comprises:

a first driving circuit configured to output a first gate signal to the first transistor;

a second driving circuit configured to output a second gate signal to the second transistor;

a third driving circuit configured to output a third gate signal to the third transistor; and a fourth driving circuit configured to output a fourth gate signal to the fourth transistor, the plurality of pixels configured to operate in a first driving period during which light is emitted in response to a pre-written data signal, and a second driving period during which a new data signal is written and light is emitted in response to the new data signal, the first driving circuit is configured to output the first gate signal for turning the first transistor on in the second driving period, the second driving circuit is configured to output the second gate signal for turning the second transistor on in the second driving period, the third driving circuit is configured to output the third gate signal for turning the third transistor on in each of the first driving period and the second driving period, the fourth driving circuit is configured to output the fourth gate signal for turning the fourth transistor on in each of the first driving period and the second driving period, and the third driving circuit and the fourth driving circuit share a first clock line.

15. The electronic device of claim 14, wherein each of the third driving circuit and the fourth driving circuit comprises a plurality of stages, and the first clock line comprises:

a pair of first-1 clock lines extending in a first direction and connected to odd stages from among the plurality of stages of the third driving circuit and odd stages from among the plurality of stages of the fourth driving circuit; and a pair of first-2 clock lines extending in the first direction and connected to even stages from among the plurality of stages of the third driving circuit and even stages from among the plurality of stages of the fourth driving circuit.

16. The electronic device of claim 15, further comprising a connection line extending in a second direction perpendicular to the first direction and electrically connected to the first clock line, wherein the connection line comprises:

a pair of first connection lines connected to the pair of first-1 clock lines; and a pair of second connection lines connected to the pair of first-2 clock lines.

17. The electronic device of claim 16, wherein the connection line and the first clock line are arranged on different layers from each other with an insulating layer therebetween, a plurality of contact holes in contact with the connection line and the first clock line are defined in the insulating layer, and from among the plurality of contact holes, a first contact hole in contact with one of the pair of first-1 clock lines and one of the pair of first connection lines and a second contact hole in contact with another one of the pair of first-1 clock lines and another one of the pair of first connection lines are located on a same virtual straight line extending along the second direction in a plan view.

18. The electronic device of claim 17, wherein from among the plurality of contact holes, a virtual straight line extending along the second direction and passing through a third contact hole in contact with one of the pair of first-2 clock lines and one of the pair of second connection lines, and a virtual straight line extending along the second direction and passing through a fourth contact hole in contact with another one of the pair of first-2 clock lines and another one of the pair of second connection lines are parallel to each other in the plan view.

19. The electronic device of claim 14, wherein the first driving circuit and the second driving circuit are arranged adjacent to one of a left side and a right side of the display area, and the third driving circuit and the fourth driving circuit are arranged adjacent to another of the right side and the left side of the display area.

20. The electronic device of claim 14, wherein the first driving circuit and the second driving circuit share a second clock line.

* * * * *